(12) United States Patent
Garreau et al.

(10) Patent No.: US 9,888,314 B2
(45) Date of Patent: Feb. 6, 2018

(54) SELF-CONFIGURATION OF A DEVICE IMPLEMENTING AN AMBIENT NOISE CANCELLATION MECHANISM

(71) Applicant: FRANCE BREVETS, Paris (FR)

(72) Inventors: Frédéric Garreau, Betton (FR); Erwan Nogues, Rennes (FR); Mathieu Chacun, La Brulatte (FR); Simon Lebreton, Cesson Sevigne (FR)

(73) Assignee: FRANCE BREVETS, Paris (FR)

( * ) Notice: Subject to any disclaimer, the term of this patent is extended or adjusted under 35 U.S.C. 154(b) by 0 days.

(21) Appl. No.: 15/504,443

(22) PCT Filed: Aug. 28, 2015

(86) PCT No.: PCT/EP2015/069731
§ 371 (c)(1),
(2) Date: Feb. 16, 2017

(87) PCT Pub. No.: WO2016/030499
PCT Pub. Date: Mar. 3, 2016

(65) Prior Publication Data
US 2017/0238084 A1    Aug. 17, 2017

(30) Foreign Application Priority Data
Aug. 28, 2014    (FR) ..................... 14 58054

(51) Int. Cl.
*H04R 1/10*    (2006.01)
*G06F 3/01*    (2006.01)
(Continued)

(52) U.S. Cl.
CPC ........... *H04R 1/1083* (2013.01); *G06F 3/012* (2013.01); *G10K 11/178* (2013.01);
(Continued)

(58) Field of Classification Search
CPC ...... H04R 1/1083; H04R 1/1041; H04R 3/04; H04R 2201/107; H04R 2420/05; G06F 3/02; G10K 11/178
See application file for complete search history.

(56) References Cited

U.S. PATENT DOCUMENTS

2008/0130911 A1* 6/2008 Tsen .................. H04R 5/04
                                                       381/74
2008/0285776 A1  11/2008 Wu et al.
(Continued)

FOREIGN PATENT DOCUMENTS

GB           2502983 A      12/2013

OTHER PUBLICATIONS

International Search Report for PCT/EP2015/069731, dated Dec. 9, 2015.
Written Opinion for PCT/EP2015/069731, dated Dec. 9, 2015.

*Primary Examiner* — Brenda Bernardi
(74) *Attorney, Agent, or Firm* — Meagher Emanuel Laks Goldberg & Liao, LLP

(57) ABSTRACT

A device has a standard female audio connector that is capable of receiving four-pole male connectors and three-pole male connectors and implements: means (CTRL, VCC, S1) for selectively transmitting a DC power supply signal via a first pin (DP1) of said connector; means (CTRL, ANC) for selectively activating a cancellation mechanism for ambient noise from digital audio signals that are intended to be received, via the first pin, in a manner superimposed on said DC power supply signal; means (CTRL, MIF) for selectively transmitting via a second pin of said connector, in a manner superimposed on said audio signals, a timing clock that is intended for digital microphones (DML, DMR) or other sensors; means (CTRL) for configuring itself vis-à-vis the DC power supply signal, the ambient noise can-
(Continued)

Figure 1:
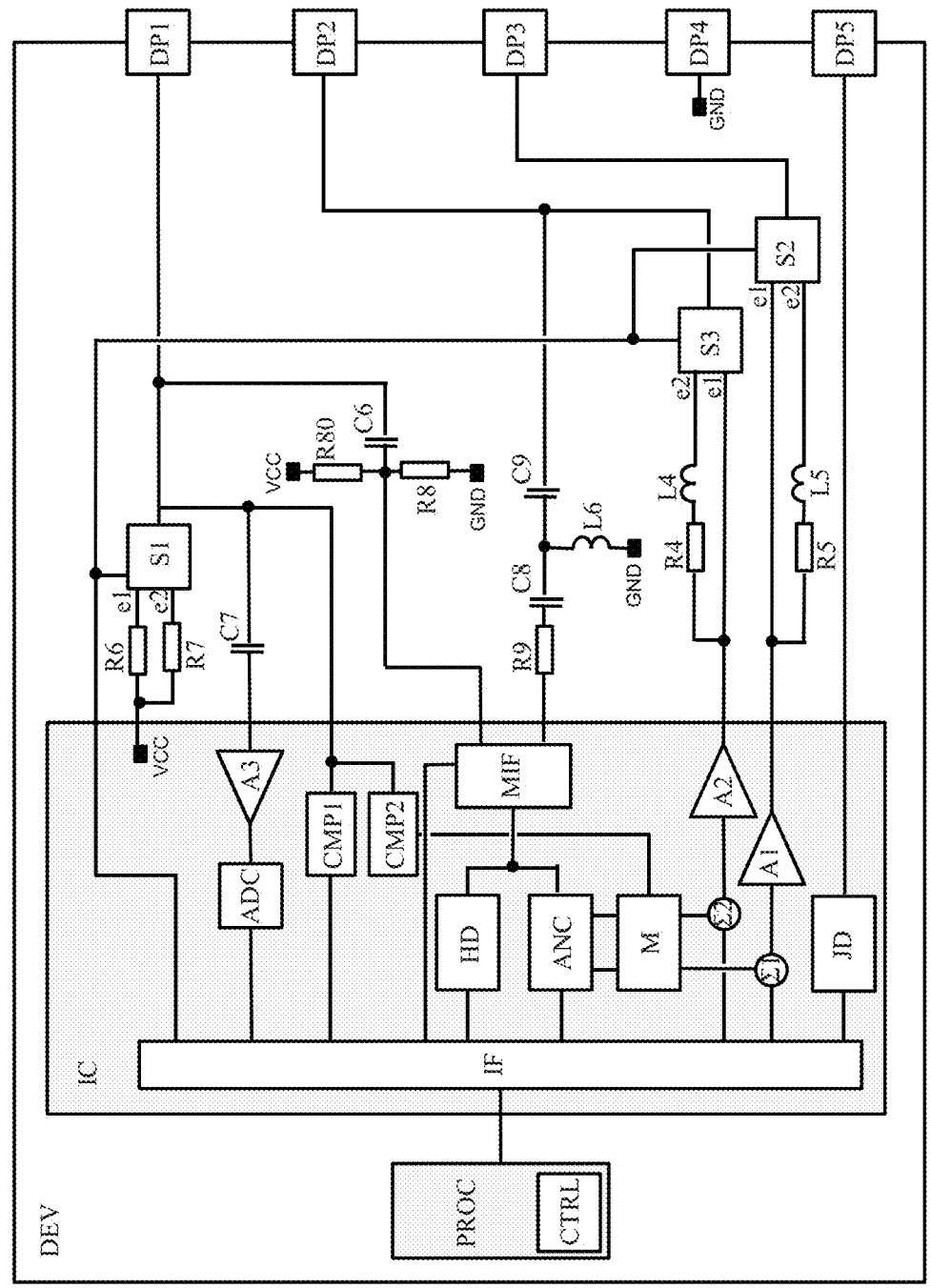

cellation mechanism and the timing clock, according to a determined type of listening device that is effectively connected via said connector.

14 Claims, 9 Drawing Sheets

(51) Int. Cl.
    *G10K 11/178*     (2006.01)
    *H04R 3/04*     (2006.01)

(52) U.S. Cl.
    CPC .............. *H04R 1/1041* (2013.01); *H04R 3/04* (2013.01); *H04R 2201/107* (2013.01); *H04R 2420/05* (2013.01)

(56) References Cited

U.S. PATENT DOCUMENTS

| | | |
|---|---|---|
| 2012/0051562 A1 | 3/2012 | Kim |
| 2014/0205109 A1 | 7/2014 | Theiler |

* cited by examiner

SELF-CONFIGURATION OF A DEVICE IMPLEMENTING AN AMBIENT NOISE CANCELLATION MECHANISM

The present invention concerns the interconnection of a device for providing audio content and a listening device via a standard audio connector, while providing the listening device with the benefit of an ambient noise cancellation mechanism that is implemented by the device for providing audio content. More particularly, the present invention concerns the configuration management of the device for providing audio content vis-à-vis the ambient noise cancellation mechanism according to the capabilities of the listening device as detected via the standard female connector with which the device for providing audio content is equipped.

In order to be able to implement an ambient noise cancellation mechanism, digital microphones are typically used. These digital microphones are respectively intended to be placed close to the ears of a user wishing to listen to an audio content while benefiting from the ambient noise cancellation mechanism. Signals that are provided by said digital microphones and that are representative of the ambient noise are then used to generate antinoise signals that are added to the audio signals that are representative of said audio content in order to cancel the ambient noise.

According to a first known arrangement example, an integrated circuit implementing the noise cancellation mechanism is part of the equipment of an audio headset, or earphones, integrating digital microphones. On the basis of this arrangement, the audio headset can be equipped with a 3.5 mm male connector of the TRRS (Tip Ring Ring Sleeve) type, that is to say having four poles, in order to be able to receive the audio signals that are representative of the content from a providing device, such as a mobile phone or a digital music player. Such an arrangement requires the integrated circuit and the digital microphones to be powered by a battery, which increases the bulk of the audio headset. This additional bulk linked to the integrated circuit and to the battery is all the more detrimental in the case of earphones.

On the basis of a second known arrangement example, an integrated circuit implementing the noise cancellation mechanism is part of the equipment of the device for providing the audio content. Such an arrangement makes it possible to avoid having to equip the audio headset, or the earphones, with a battery. However, in order to be able to receive the signals from the digital microphones and to power said digital microphones, a nonstandard male connector (hence not a 3.5 mm male connector of TRRS type) must be part of the equipment of the audio headset, and the providing device must have a female connector that is able to receive such male connectors.

Relying on nonstandard audio connectors presents backward compatibility problems. Relying on a standard connector as mentioned above presents power supply and bulk problems as touched upon above.

It would be desirable to provide a solution that makes it possible to rely on such a standard connector in order to ensure backward compatibility, but that does not present the bulk problems touched upon above. Within this context, it is moreover desirable to allow said providing device to have the capability of automatically detecting the type of the listening device, e.g. headset or earphones, that the user connects to said providing device. Indeed, the user can insert into the female connector of said providing device a male connector of TRRS type or of TRS (Tip Ring Sleeve) type, that is to say having three poles, and the listening device may or may not be equipped with an analogue vocal microphone suited to capturing the voice of the user, notably in order to allow telephone conversations to be conducted in hands free mode.

It is therefore desirable to overcome these various disadvantages of the prior art.

It is notably desirable to provide a solution that is simple to implement and of low cost.

The invention concerns a device for providing audio content, said device configured to provide a listening device with audio signals that are representative of said audio content via a standard female audio connector configured to receive four-pole male connectors and three-pole male connectors, comprising: first circuit logic configured to selectively transmit a DC power supply signal to the listening device via a first pin of said standard female audio connector; second circuit logic configured to selectively implement a cancellation mechanism of ambient noise using digital audio signals to be received, via the first pin, being superimposed on said DC power supply signal; third circuit logic configured to selectively transmit to the listening device via a second pin of said standard female audio connector, a timing clock superimposed on said audio signals and configured to drive sensors equipping the listening device to generate digital signals via said first pin; and fourth circuit logic configured to configure itself vis-à-vis the DC power supply signal, the ambient noise cancellation mechanism and the timing clock, according to a determined type of listening device that is effectively connected via said standard female audio connector. Said device for providing audio content is moreover such that, following detection of a male connector that is present in said standard female audio connector, said device for providing audio content successively implements: fifth circuit logic configured to determine if there is a short circuit between said first pin and an earth of said device for providing audio content, and if this is the case said device for providing audio content is configured to determine that the connected listening device is of a first type; sixth circuit logic configured to determine, by activating said timing clock, whether signals from sensors are received as superimposed on said DC power supply signal via said first pin, and if this is not the case said device for providing audio content is configured to determine that the connected listening device is of a second type; and seventh circuit logic configured to determine, by deactivating said timing clock, whether said first pin has a power consumption below a predefined threshold, and if this is the case said device for providing audio content is suited to determining that the connected listening device is of a third type, and otherwise of a fourth type. In this way, the ambient noise cancellation mechanism is implemented on the device for providing audio content while using a standard female audio connector that is capable of accepting three- or four-pole male connectors, and the device for providing audio content is adequately and automatically configured according to the type of listening device that is effectively connected to it.

According to a particular embodiment, when the connected listening device is determined to be of the first type said device for providing audio content configures itself so as to deactivate the DC power supply signal via said first pin, to deactivate the ambient noise cancellation mechanism, and to deactivate said timing clock. In this way, the device for providing audio content is adequately configured to work with a conventional listening device that is not suited to allowing the implementation of the ambient noise cancellation mechanism and that does not have a vocal microphone in order to capture the voice of a user of said listening device.

According to a particular embodiment, when the connected listening device is determined to be of the second type said device for providing audio content configures itself so as to deactivate the ambient noise cancellation mechanism, to deactivate said timing clock, to activate the DC power supply signal via said first pin to a value taking account of the fact that the ambient noise cancellation mechanism is deactivated, and to obtain an analogue audio signal that is representative of voice capture from a user of said listening device and received in a manner superimposed on said DC power supply signal via said first pin. In this way, the device for providing audio content is adequately configured to work with a conventional listening device that is not suited to allowing the implementation of the ambient noise cancellation mechanism and that has an analogue vocal microphone in order to capture the voice of a user of said listening device.

According to a particular embodiment, when the connected listening device is determined to be of the third type said device for providing audio content configures itself so as to activate the ambient noise cancellation mechanism, to activate said timing clock, and to activate the DC power supply signal via said first pin to a value taking account of the fact that the ambient noise cancellation mechanism is activated. In this way, the device for providing audio content is adequately configured to work with a listening device that is suited to allowing the implementation of the ambient noise cancellation mechanism and that does not have a vocal microphone in order to capture the voice of a user of said listening device.

According to a particular embodiment, when the connected listening device is determined to be of the fourth type said device for providing audio content configures itself so as to activate the ambient noise cancellation mechanism, to activate said timing clock, to activate the DC power supply signal via said first pin to a value taking account of the fact that the ambient noise cancellation mechanism is activated, and, in the case of an application requiring capture of signals from the sensors, to use said digital audio signals received via said first pin within the context of said application. In this way, the device for providing audio content is adequately configured to work with a listening device that is suited to allowing the implementation of the ambient noise cancellation mechanism. Moreover, although the listening device has a vocal microphone in order to capture the voice of a user of said listening device, the voice of the user is captured without relying on this vocal microphone, in order to provide the benefit of the ambient noise cancellation mechanism within the context of said application.

According to a particular embodiment, when the connected listening device is determined to be of the fourth type said device for providing audio content configures itself, in the case of an application not requiring capture of signals from the sensors, so as to activate the ambient noise cancellation mechanism, to activate said timing clock, and to activate the DC power supply signal via said first pin to a value taking account of the fact that the ambient noise cancellation mechanism is activated, and, in the case of an application requiring capture of signals from the sensors, so as to deactivate the ambient noise cancellation mechanism, to deactivate said timing clock, to activate the DC power supply signal via said first pin to a value taking account of the fact that the ambient noise cancellation mechanism is deactivated, and to use an analogue signal that is representative of signals from the sensors and received in a manner superimposed on said DC power supply signal via said first pin within the context of said application. In this way, the device for providing audio content is adequately configured to work with a listening device that is suited to allowing the implementation of the ambient noise cancellation mechanism and that has a vocal microphone in order to capture the voice of a user of said listening device.

According to a particular embodiment, said device for providing audio content is further configured so that the DC power supply signal has a distinct value according to whether or not the noise cancellation mechanism is activated, and said device for providing audio content implements: a mechanism for detecting the push of a control button, relying on a comparison of voltage applied to said first pin with a set of thresholds that is selected from two distinct sets of thresholds, said sets of thresholds being respectively adapted to said distinct values of the DC power supply; and eighth circuit logic configured to select the set of thresholds to be applied according to whether or not the noise cancellation mechanism is activated. In this way, pushes of said control buttons are adequately detected according to the configuration of the device for providing audio content vis-à-vis the listening device.

According to a particular embodiment, when the ambient noise cancellation mechanism is activated said device for providing audio content further comprises: ninth circuit logic configured to generate correction signals in the ambient noise cancellation mechanism; tenth circuit logic configured to add the correction signals to said audio signals; and, when the push of a control button is thus detected, eleventh circuit logic configured to stop the addition of the correction signals to said audio signals until the push of said control button is stopped. In this way, interference between pushes of the control buttons and the ambient noise cancellation mechanism is reduced or even avoided.

According to a particular embodiment, in order to transmit said timing clock to the listening device, said timing clock being superimposed on said audio signals, said device for providing audio content comprises a high-pass filter applied to a square-wave clock signal, itself comprising: a resistor; a first capacitor and a second capacitor; and a coil, which are arranged so that the resistor is configured to receive the square-wave clock signal, the first and second capacitors being in series with the resistor such that the first capacitor is between the resistor and the second capacitor, the coil being connected between an earth and a point at which the first and second capacitors are interconnected, another terminal of the second capacitor being connected to said second pin. In this way, interference between said timing clock and said audio signals is reduced or even avoided.

According to a particular embodiment, the sensors comprise a digital microphone to capture the voice of a user of the listening device.

According to a particular embodiment, the sensors comprise motion sensors to capture movement of the head of a user of the listening device.

According to a particular embodiment, the second circuit logic is configured to transition progressively between off and on states of the noise cancellation mechanism.

The invention likewise concerns a method implemented by a device for providing audio content providing a listening device with audio signals that are representative of said audio content via a standard female audio connector that is configured to receive four-pole male connectors and three-pole male connectors, said device for providing audio content performing the following steps: selectively transmitting a DC power supply signal to the listening device via a first pin of said standard female audio connector; selectively implementing a cancellation mechanism for ambient noise from digital audio signals to be received, via the first pin, being superimposed on said DC power supply signal; selectively transmitting to the listening device via a second pin of said standard female audio connector, a timing clock superimposed on said audio signals to drive sensors equipping the listening device in order to generate digital signals via said first pin; configuring itself vis-à-vis the DC power supply signal, the ambient noise cancellation mechanism and the timing clock, according to a determined type of listening device that is effectively connected via said standard female audio connector. Moreover, following detection of a male connector that is present in said standard female audio connector, said device for providing audio content successively performs the following steps: determining if there is a short circuit between said first pin and the earth, and if this is the case said device for providing audio content determines that the connected listening device is of a first type; determining, by activating said timing clock, whether signals from sensors are received being superimposed on said DC power supply signal via said first pin, and if this is not the case said device for providing audio content determines that the connected listening device is of a second type; and determining, by deactivating said timing clock, whether said first pin has a power consumption below a predefined threshold, and if this is the case said device for providing audio content determines that the connected listening device is of a third type, and otherwise of a fourth type.

The invention likewise concerns a computer program that can be stored on a non-transient storage device. This computer program comprises instructions for implementing the method mentioned above when said program is executed by the processor. The invention likewise concerns storage means comprising such a computer program.

Also, thanks to the invention, it becomes possible to transmit all kinds of digital signals from the headset/headphones to a distant processor using the standard connector whereby the digital microphone(s) signals are transmitted being superimposed on the analogue signals paths. For instance, signals from motion sensors positioned on the headset may be transmitted by being superimposed on the analogue signals paths. These signals from motion sensors may be further used to adapt the audio signals to the actual motion of the head of the user, by implementing personalization algorithms which are known in the art, for instance personalization and contextualization of Head Related Transfer Functions (HRTF) which allow a much better rendering of sound. This example is provided as illustrative only, and not limiting, of the type of signals which may be superimposed on the audio signals, using the arrangement of the invention. A timing clock signal is sent from the processing device, being superimposed to the audio signal. The return path is used to transmit the signals from the sensors to the processing device. Part of the pre-processing of the motion sensors may be located in the headsets. Other types of sensors of any kind of physical parameter which can be converted to digital data may be included in the listening device, such as sensors to measure pressure, temperature, humidity, etc. . . . .

Figure 2A:
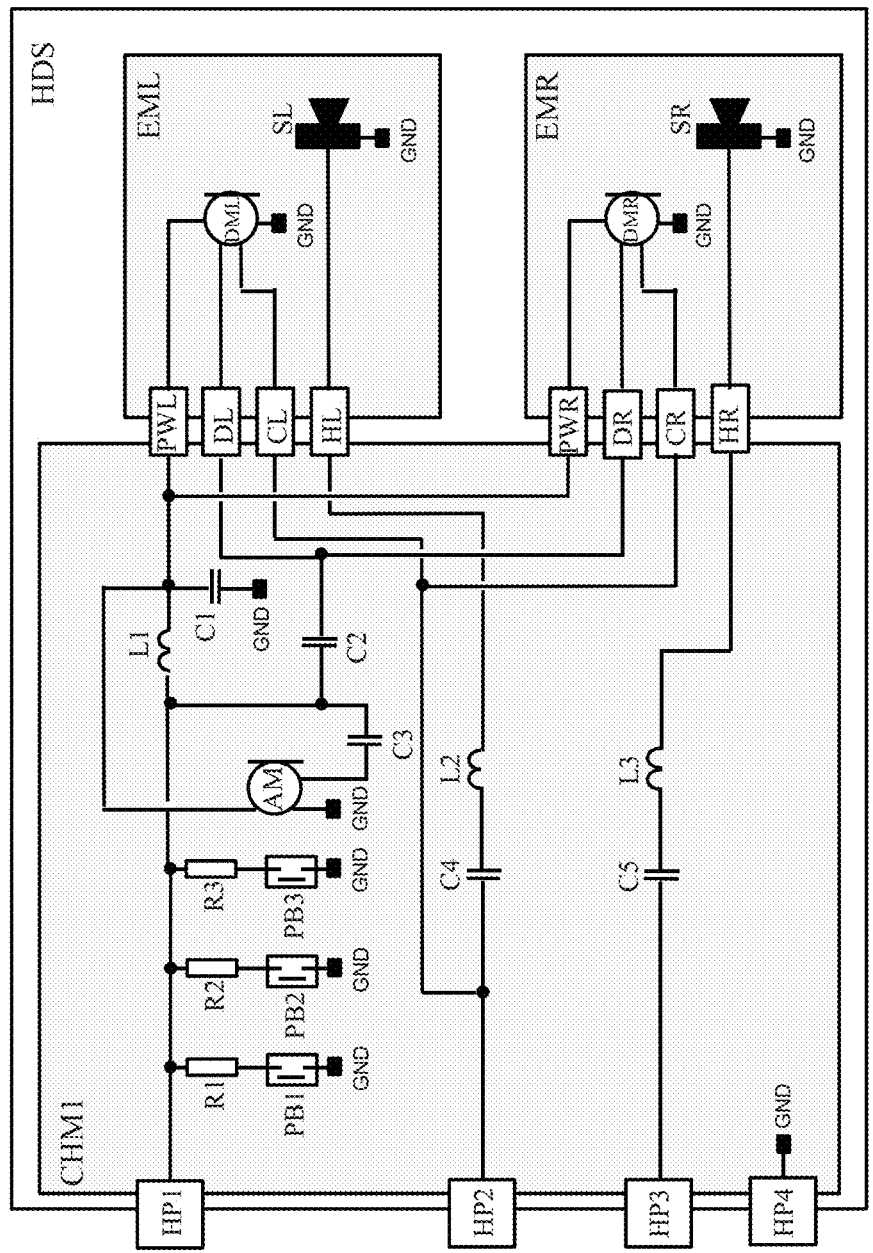
Figure 2B:
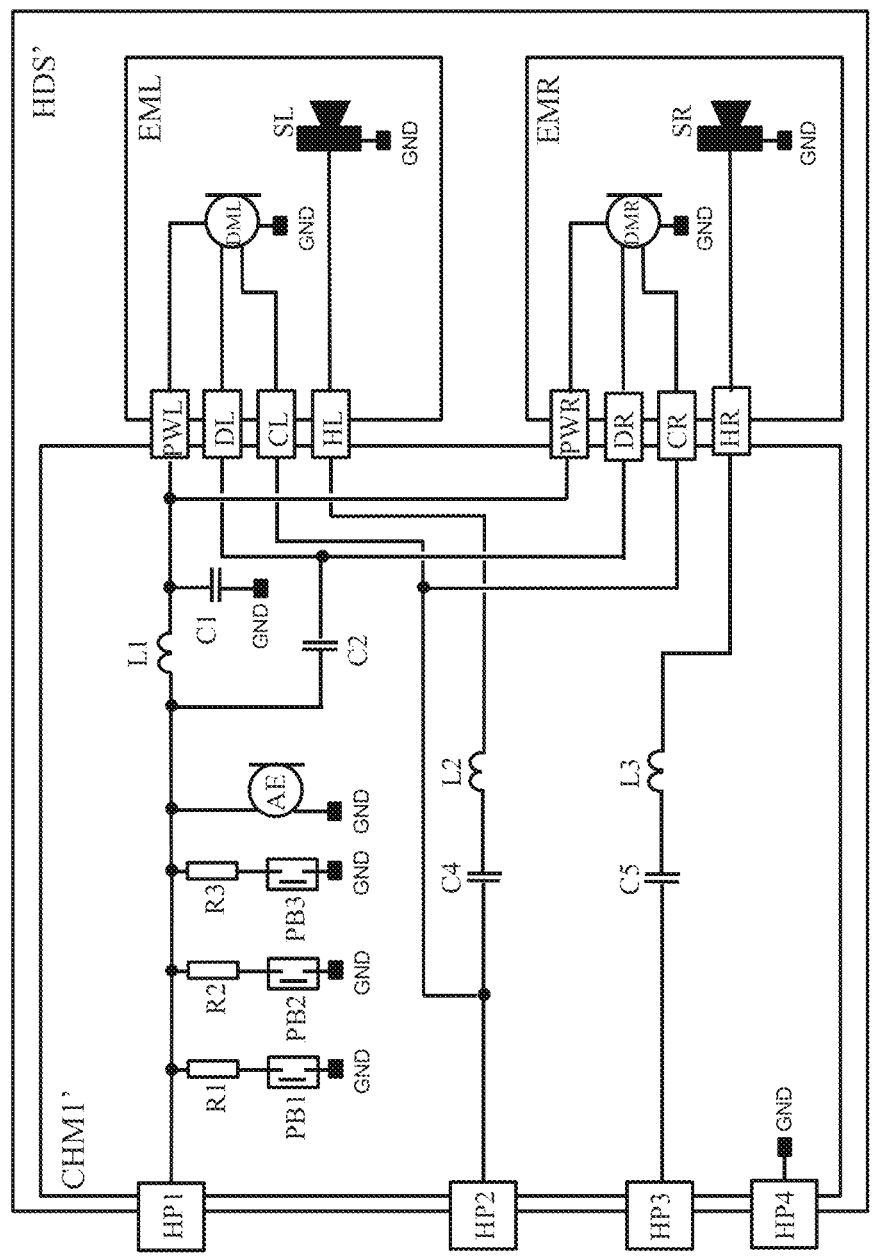
Figure 3:
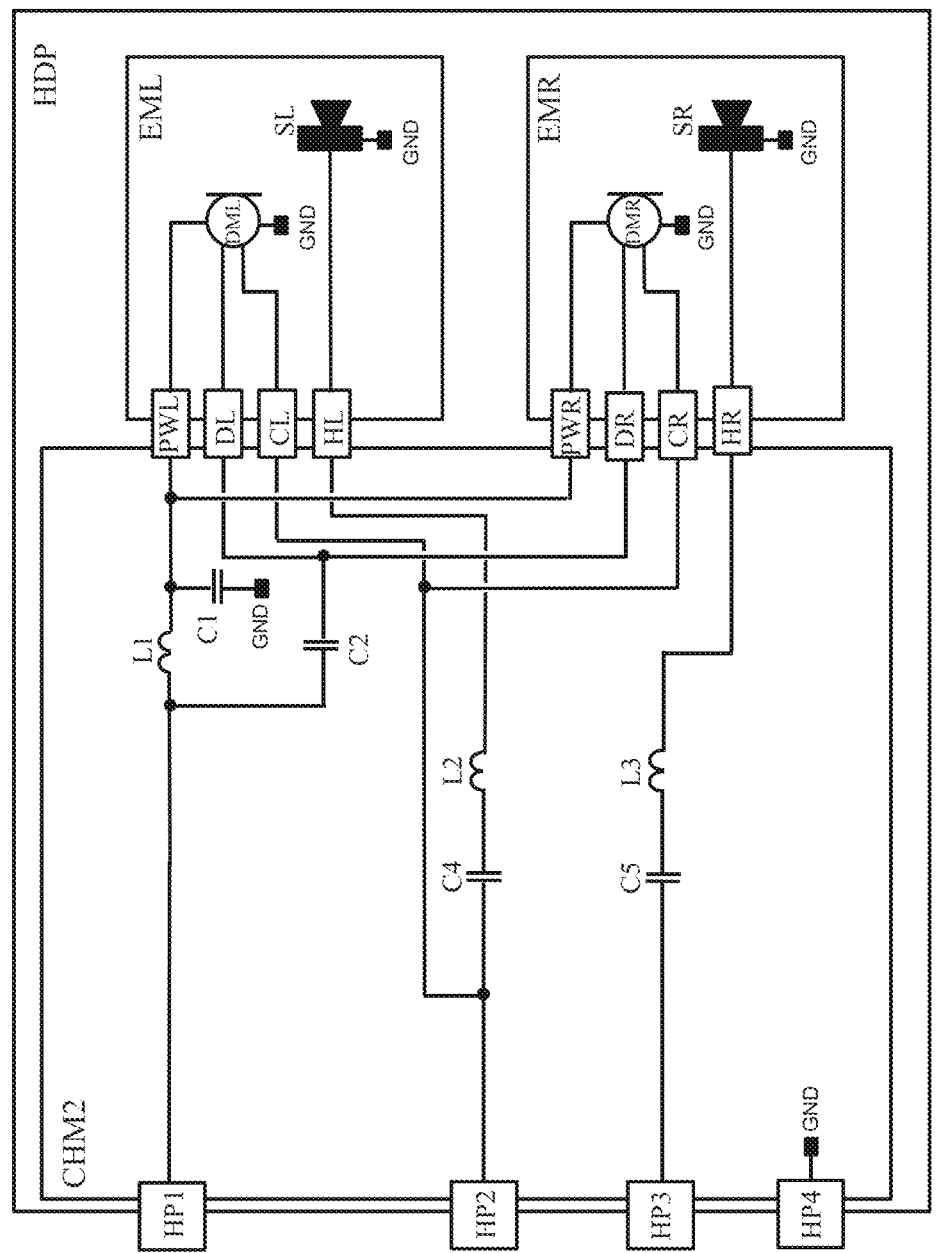
Figure 4:
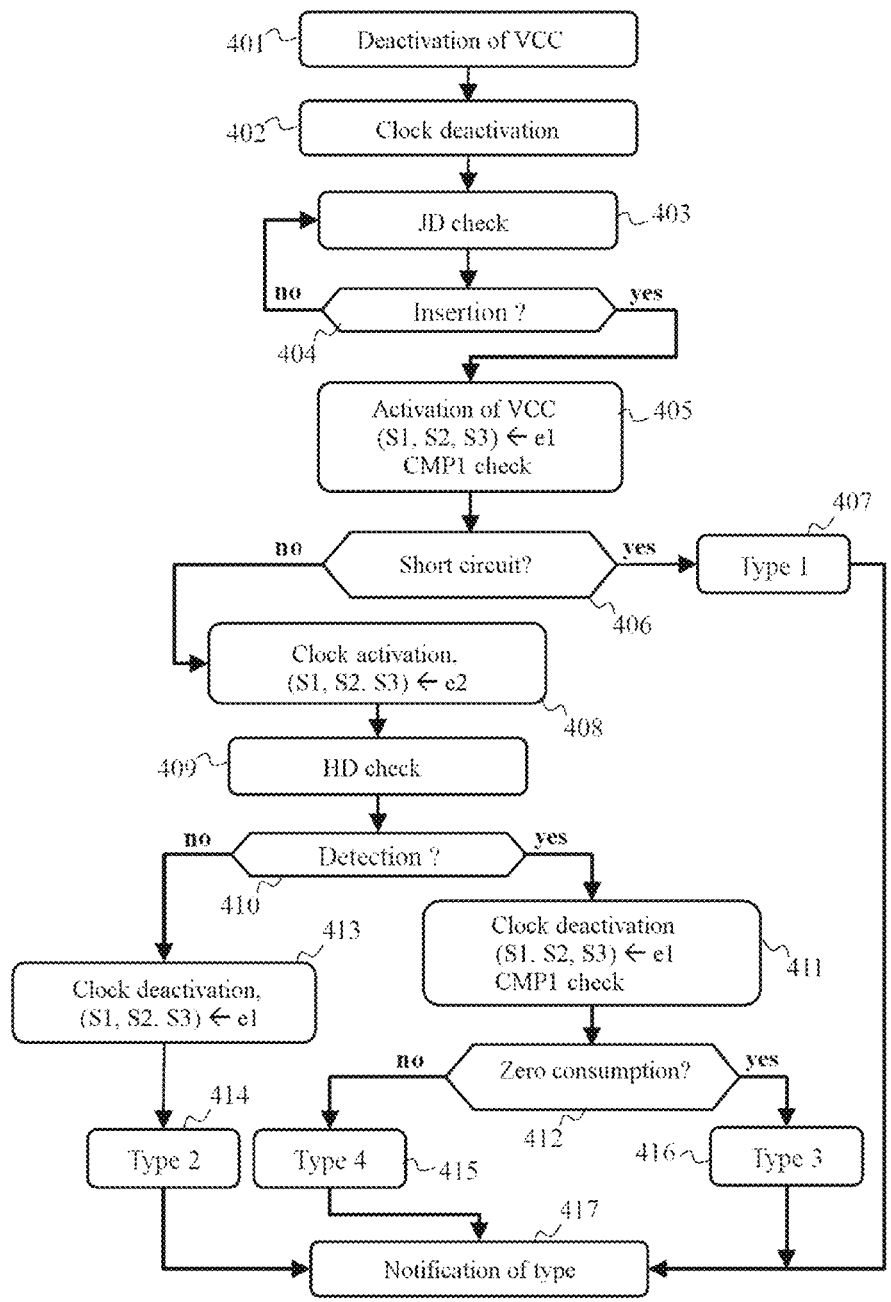
Figure 5:
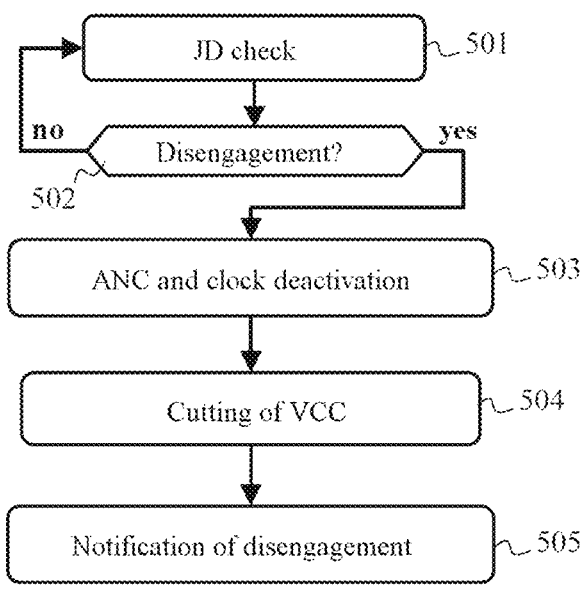
Figure 6:
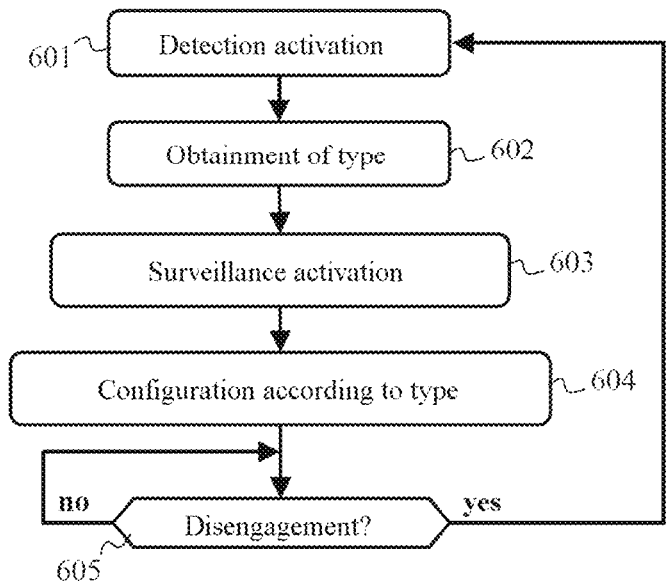
Figure 7:
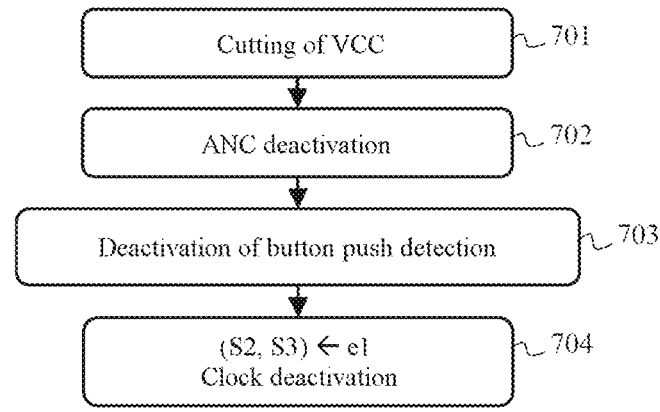
Figure 8:
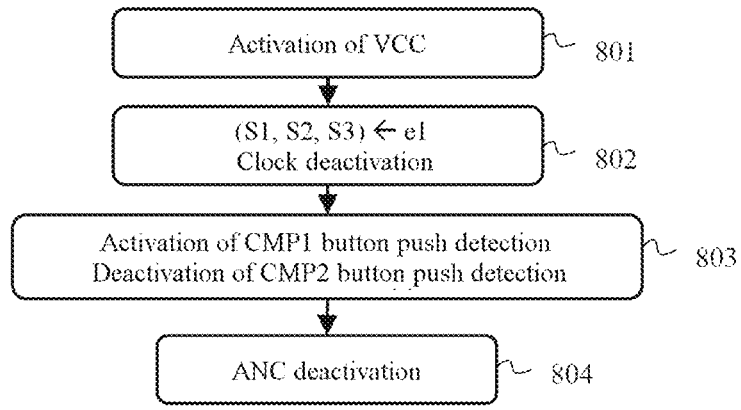
Figure 9:
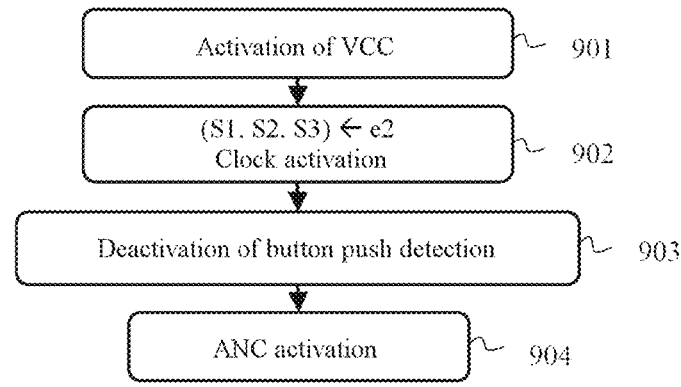
Figure 10:
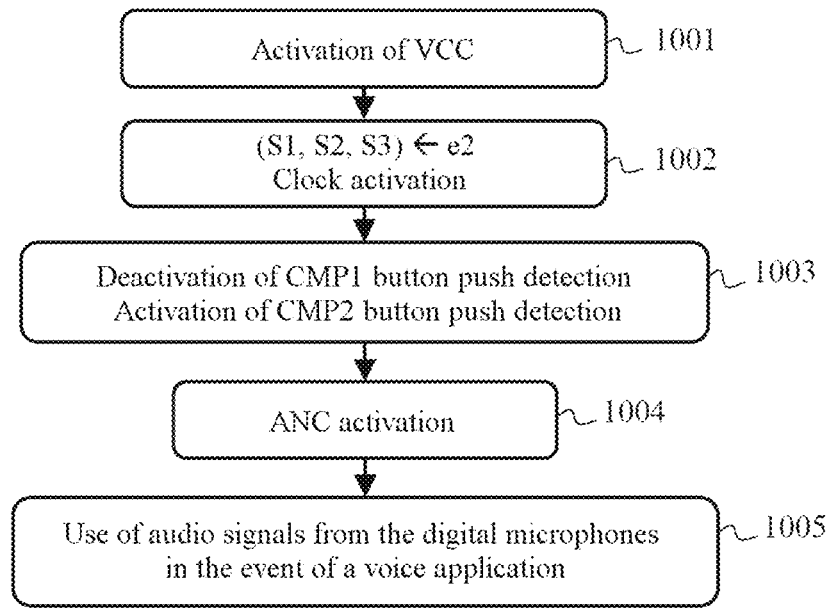
Figure 11:
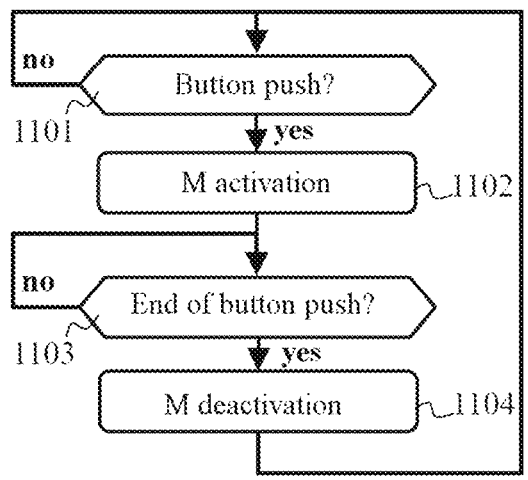
Figure 12:
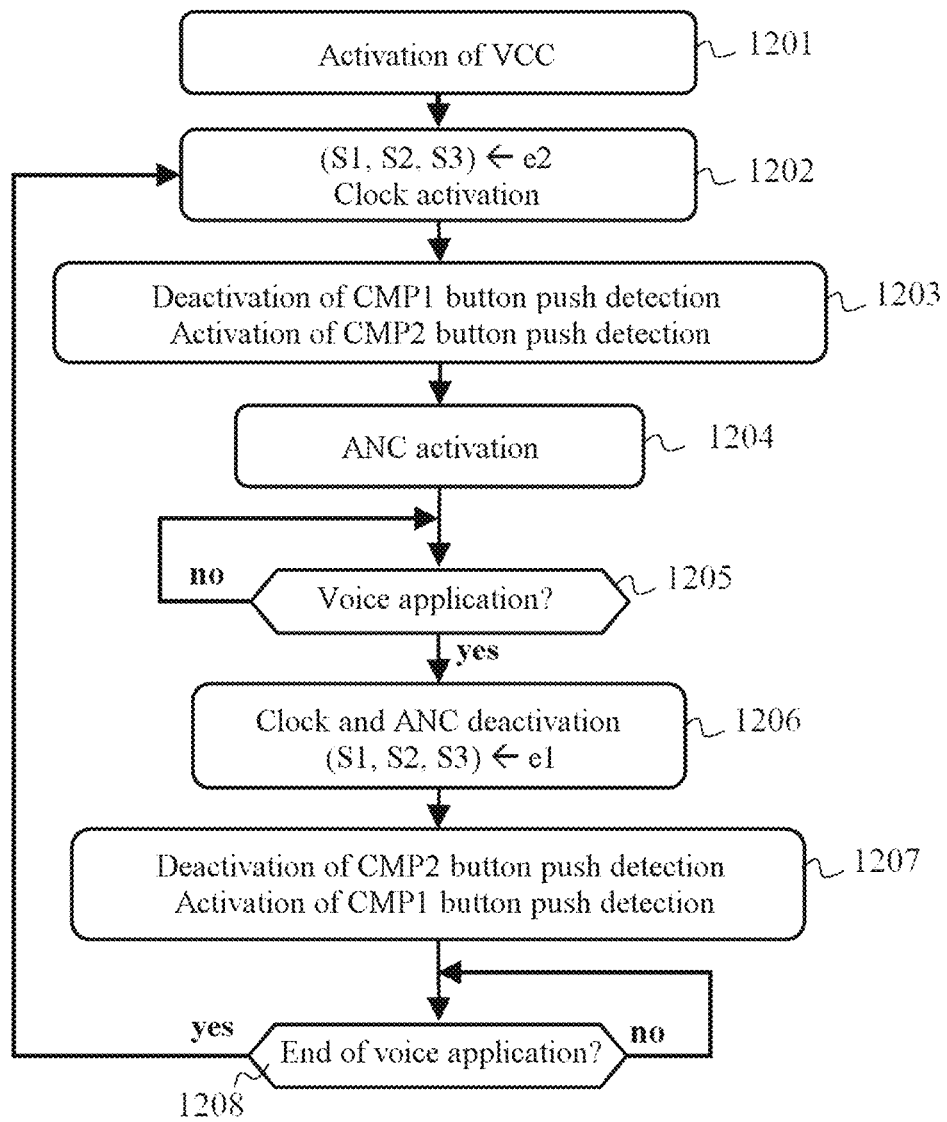

The features of the invention that are mentioned above, and others, will emerge more clearly upon reading the following description of an exemplary embodiment, said description being provided with reference to the appended drawings, among which:

FIG. 1 schematically illustrates a device for providing audio content implementing an ambient noise cancellation mechanism;

FIG. 2A schematically illustrates a first device for listening to audio content providing the benefit of the ambient noise cancellation mechanism that is implemented by the device for providing audio content in FIG. 1 and variants thereof;

FIG. 2B schematically illustrates a second device for listening to audio content providing the benefit of the ambient noise cancellation mechanism that is implemented by the device for providing audio content in FIG. 1 and variants thereof;

FIG. 3 schematically illustrates a third device for listening to audio content providing the benefit of the ambient noise cancellation mechanism that is implemented by the device for providing audio content in FIG. 1 and variants thereof;

FIG. 4 schematically illustrates an algorithm, implemented by said device for providing audio content, for detecting a type of listening device that is connected to said device for providing audio content;

FIG. 5 schematically illustrates an algorithm, implemented by said device for providing audio content, for monitoring maintenance of connection between said device for providing audio content and a listening device that is connected to said device for providing audio content;

FIG. 6 schematically illustrates an algorithm, implemented by said device for providing audio content, for configuring said device for providing audio content according to the type of the listening device that is connected to said device for providing audio content;

FIG. 7 schematically illustrates an algorithm, implemented by said device for providing audio content, for applying a first configuration of said device for providing audio content when the listening device connected to said device for providing audio content is of a first type;

FIG. 8 schematically illustrates an algorithm, implemented by said device for providing audio content, for applying a second configuration of said device for providing audio content when the listening device connected to said device for providing audio content is of a second type;

FIG. 9 schematically illustrates an algorithm, implemented by said device for providing audio content, for applying a third configuration of said device for providing audio content when the listening device connected to said device for providing audio content is of a third type;

FIG. 10 schematically illustrates an algorithm, implemented by said device for providing audio content, for applying a fourth configuration of said device for providing audio content when the listening device connected to said device for providing audio content is of a fourth type;

FIG. 11 schematically illustrates an algorithm, implemented by said device for providing audio content, for managing application of the ambient noise cancellation mechanism; and FIG. 12 schematically illustrates an algorithm that has a variant of the algorithm in FIG. 10.

FIG. 1 schematically illustrates a device DEV for providing audio content implementing an ambient noise cancellation mechanism vis-à-vis a user using a listening device, such as an audio headset or earphones, connected to the device DEV.

By way of example, the device DEV is a mobile phone, a personal audio player, a computer, a tablet computer, an audiovisual player, a vehicle or aeroplane infotainment system, or any type of device that is capable of providing an audio content in the form of analogue audio signals via a standard female audio connector that is suited to receiving 3.5 mm male connectors of TRRS (hence four-pole) or TRS (hence three-pole) type. The device DEV is thus intended to be connected to a listening device that is equipped with a male connector of TRRS or TRS type in order to allow the user to listen to the audio content.

A listening device equipped with a 3.5 mm male connector of TRRS type can thus be connected to the device DEV in order to listen to the audio content, while providing the user with the benefits of the ambient noise cancellation mechanism.

A listening device equipped with a 3.5 mm male connector of TRS type can also be connected thereto in order to listen to the audio content, but the user then cannot benefit from the ambient noise cancellation mechanism.

As explained in detail below, different configurations of the device DEV are automatically operated according to the functionalities, as detected by the device DEV via said standard female audio connector, of the listening device that is effectively connected to the device DEV.

The various pins of said standard female audio connector are referenced DP1, DP2, DP3 and DP4 in FIG. 1. The pin DP2 is the point of contact with the tip of the male connector of TRRS type, the pin DP3 is the point of contact thereof with the ring near the tip, the pin DP1 is the point of contact thereof with the ring near the sleeve, and the pin DP4 is the point of contact thereof with the sleeve. A pin DP5 is also shown in FIG. 1. The pin DP5 is a pin for detecting the presence of a male connector, for instance of TRRS or TRS type, inserted in said standard female audio connector.

When a male connector of TRS type is inserted into said standard female audio connector, the pin DP1 is shorted to the pin DP5. The device DEV then does not provide a supply of power to the listening device connected to the device DEV, and the device DEV is not capable of receiving signals or information from said listening device. The listening device is then also not able to have an analogue vocal microphone to capture the voice of the user and to provide a corresponding analogue audio signal for said device DEV (just as it would be necessary for this to be the case in order to conduct a telephone conversation).

The pin DP4 is connected to the earth, denoted GND, of the device DEV, which allows a common earth to be set up between the device DEV and the listening device that is connected thereto.

A first device for listening to audio content that is equipped with a 3.5 mm male connector of TRRS type and that provides the benefit of the ambient noise cancellation mechanism is described below with reference to FIG. 2A, a second device for listening to audio content that is equipped with a 3.5 mm male connector of TRRS type and that provides the benefit of the ambient noise cancellation mechanism is described below with reference to FIG. 2B, and a third device for listening to audio content that is equipped with a 3.5 mm male connector of TRRS type and that provides the benefit of the ambient noise cancellation mechanism is described below with reference to FIG. 3. The first and second listening devices have the same functionalities, but have slightly different respective structures. The third listening device has a structure in common with the first and second listening devices, as explained in detail below, but has different functionalities.

The device DEV in FIG. 1 has a processor PROC implementing a control software module CTRL and also has an integrated circuit IC. The control software module CTRL is notably in charge of driving the integrated circuit IC within the context of providing audio content via said standard female audio connector and within the context of implementing the ambient noise cancellation mechanism. The integrated circuit IC thus has an interface IF making it possible to receive commands and parameters from the control software module CTRL and making it possible to transmit information and interrupts to the control software module CTRL.

The integrated circuit IC moreover has a module ANC that is suited to implementing the ambient noise cancellation mechanism. By way of example, the module ANC implements finite impulse response filtering FIR, for example a filter having a length of two hundred coefficients that would be applied to samples subjected to pulse code modulation (PCM) at 48 kHz. The module ANC is activated by the control software module CTRL via the interface IF when listening to the audio content provided by the device DEV via the standard female audio connector allows implementation of the ambient noise cancellation mechanism. As explained in detail later, this aspect is notably dependent on the functionalities implemented by the listening device that is effectively connected to the device DEV.

The module ANC is suited to generating left-side correction signals and right-side correction signals, which are intended to be respectively added to left-side audio signals and right-side audio signals provided by the processor PROC for listening. The right-side audio signals are thus provided in digital form by the processor PROC via the interface IF and the right-side correction signals, themselves also in digital form, are added to the right-side audio signals at the output of the interface IF by a first adder $\Sigma 1$ of the integrated circuit IC, and then the resultant signals are amplified by virtue of a first amplifier A1 of the integrated circuit IC. The left-side audio signals are thus provided in digital form by the processor PROC via the interface IF and the left-side correction signals, themselves also in digital form, are added to the left-side audio signals at the output of the interface IF by a second adder $\Sigma 2$ of the integrated circuit IC, and then the resultant signals are amplified by virtue of a second amplifier A2 of the integrated circuit IC. The first A1 and second A2 amplifiers are suited to performing digital-to-analogue conversion so as to provide the listening device connected to the device DEV with audio signals in analogue form.

The integrated circuit IC moreover preferably has a module M that is positioned between the module ANC and each of the adders $\Sigma 1$ and $\Sigma 2$, and suited to muting, on command, the correction signals from the module ANC. In other words, the module M makes it possible to stop the addition of the correction signals to the audio signals provided via the interface IF. This aspect is explained in detail later on.

The integrated circuit IC moreover has a module JD that is suited to detecting that a male connector of TRRS or TRS type is, or is not, inserted in said standard female audio connector. The module JD is thus connected to the pin DP5. The module JD is moreover suited to providing the control software module CTRL, via the interface IF, with information indicating whether or not the module JD has detected the insertion of a male connector of TRRS or TRS type into said standard female audio connector. On the basis of a first example, the module JD performs an impedance measurement via the pin DP5 in order to determine whether the measurement performed may correspond to the expected impedance of a male connector of TRRS or TRS type. On the basis of a second example, the pin DP5 provides a signal having a value that is dependent on whether or not a mechanical switch that is present in said standard female audio connector is activated, and the module JD decides that a male connector of TRRS or TRS type is, or is not, inserted in said standard female audio connector according to the value of said signal provided by the pin DP5.

The integrated circuit IC moreover has a module HD that is suited to determining, when a male connector of TRRS or TRS type is inserted in said standard female audio connector, the functionalities that the listening device connected to the device DEV effectively has, i.e. the type of said listening device.

The listening device effectively connected to the device DEV is one of the four following types:

Type T1: audio headset, or earphones, without a vocal microphone, and without microphones for implementing the ambient noise cancellation mechanism;

Type T2: audio headset, or earphones, with an analogue vocal microphone, and without microphones for implementing the ambient noise cancellation mechanism;

Type T3: audio headset, or earphones, without a vocal microphone, and with digital microphones for implementing the ambient noise cancellation mechanism; and Type T4: audio headset, or earphones, with an analogue vocal microphone, and with digital microphones for implementing the ambient noise cancellation mechanism.

Listening devices of type T1 are typically called "legacy headphones". Listening devices of type T1 are typically used for simply listening to a sound source provided by the device DEV (e.g. within the context of the device DEV reading an audio file). Listening devices of type T1 do not allow implementation of the ambient noise cancellation mechanism.

Listening devices of type T2 are typically called "legacy headsets". Listening devices of type T2 are typically used for listening to a sound source provided by the device DEV and for capturing the voice of the user (e.g. within the context of a telephone conversation). Listening devices of type T2 do not allow implementation of the ambient noise cancellation mechanism.

Listening devices of type T3 are typically called "ANC-enabling headphones". Listening devices of type T3 are typically used for simply listening to a sound source provided by the device DEV, just like listening devices of type T1, but allow implementation of the ambient noise cancellation mechanism.

Listening devices of type T4 are typically called "ANC-enabling headsets". Listening devices of type T4 are typically used for listening to a sound source provided by the device DEV and for capturing the voice of the user, just like listening devices of type T2, but allow implementation of the ambient noise cancellation mechanism.

The device DEV is therefore suited to detecting, notably by virtue of the module HD, the type of the listening device that is effectively connected to the device DEV, so as to implement functionalities for providing audio content that are suited to the type of listening device that is effectively connected.

The module HD is more particularly suited to determining whether the listening device connected to said device DEV allows activation of the noise cancellation mechanism, by analysing whether signals generated by digital microphones of said listening device are present. Assuming that the digital microphones generate signals of PDM (Pulse-Density Modulation) type, the module HD is, on the basis of a first example, suited to counting rising edges and/or falling edges of signals at the input of said module HD according to a timing clock for said digital microphones (e.g. 3.072 MHz). When the counter exceeds a predefined threshold of rising edges and/or falling edges over a predefined quantity of periods of said clock, the module HD assumes the presence of a listening device that allows activation of the ambient noise cancellation mechanism. On the basis of a second example, the module HD is suited to counting samples of PCM (e.g. at 48 kHz) type that are greater than or equal, in terms of absolute value, to a non-zero positive predefined value. When the counter exceeds, over a sliding window, a predefined threshold of samples that are greater than or equal, in terms of absolute value, to said predefined value, the module HD assumes the presence of a listening device that allows activation of the ambient noise cancellation mechanism. The module HD is suited to providing the control software module CTRL, via the interface IF, with a piece of information indicating whether or not the module HD has detected the presence of signals generated by digital microphones of said listening device.

The integrated circuit IC moreover has an interface module MIF for receiving signals from digital microphones that are integrated in the listening device effectively connected to the device DEV when said listening device is of type T3 or of type T4. The module MIF is suited to providing the ANC module with audio signals that are provided by said digital microphones. The module MIF is moreover suited to providing the module HD with the audio signals provided by said digital microphones. The module MIF is moreover suited to providing the timing clock of said digital microphones.

In a particular embodiment, the module MIF is moreover suited to providing the control software module CTRL with the audio signals provided by said digital microphones. This particular embodiment thus allows the digital microphones to be used as vocal microphones. The control software module CTRL is then suited to providing said audio signals for an application as executed by the processor PROC (e.g. recording of the voice of the user, or telephone conversation). As explained in detail later on, this can thus allow a listening device of type T4 to activate the ambient noise cancellation mechanism, even though an application requiring capture of the voice of the user (e.g. telephone conversation) is being executed. This can also allow a listening device of type T3 to ultimately have the same functionalities as a listening device of type T4.

The integrated circuit IC moreover has an assembly formed by a third amplifier A3 and an analogue analogue-to-digital convertor ADC, and suited to amplifying and converting into digital form an analogue signal received from the analogue vocal microphone integrated in the listening device that is effectively connected to the device DEV when said listening device is of type T2 or of type T4. The analogue-to-digital convertor ADC then provides the control software module CTRL with the signals from the analogue vocal microphone in digital form, via the interface IF. The control software module CTRL is suited to then providing said signals in digital form for an application that is executed by the processor PROC (e.g. recording of the voice of the user, or telephone conversation).

The integrated circuit IC moreover has a first comparator CMP1 and optionally a second comparator CMP2, which are arranged such that the pin DP1 is connected to the input of each of the first CMP1 and second CMP2 comparators.

The first comparator CMP1 is suited to detecting a short circuit between the pins DP1 and DP5, by measuring the voltage applied to the input of said first comparator CMP1. As explained in detail below with reference to FIG. 4, this makes it possible to distinguish between male connectors of TRRS type and male connectors of TRS type. The first comparator CMP1 is moreover suited to detecting whether the power consumption via the pin DP1 is zero or negligible, that is to say below a predefined threshold, by measuring the voltage applied to the input of said first comparator CMP1. As explained in detail below with reference to FIG. 4, this makes it possible to distinguish between listening devices of type T3 and listening devices of type T4. The first comparator CMP1 is moreover suited to providing the control software module CTRL, via the interface IF, with a piece of information indicating whether or not the first comparator CMP1 has detected such a circuit, and suited to providing the control software module CTRL, via the interface IF, with a piece of information indicating whether or not the first comparator CMP1 has detected a zero or negligible power consumption via the pin DP1.

The first comparator CMP1 implements a mechanism for detecting the push of a control button among a set of control buttons that the listening device possibly has. The first comparator CMP1 is then suited to comparing a voltage value applied to the input of said comparator CMP1 with a set of first predefined threshold values TH1 that are respectively representative of a voltage value that is expected at the input of said first comparator CMP1 upon respective pushes of the control buttons of the listening device connected to the device DEV. The first comparator CMP1 is moreover suited to providing the control software module CTRL, via the interface IF, with a piece of information indicating whether such a push is detected.

The second comparator CMP2 also implements the mechanism for detecting the push of a control button among a set of control buttons that the listening device possibly has. The second comparator CMP2 is suited to comparing a voltage value applied to the input of said comparator CMP2 with a set of second predefined threshold values TH2 that are respectively representative of a voltage value that is expected at the input of said second comparator CMP2 upon respective pushes of the control buttons of the listening device connected to the device DEV. The second comparator CMP2 is moreover suited to providing the control software module CTRL, via the interface IF, with a piece of information indicating whether such a push is detected.

The behavioural difference between the first comparator CMP1 and the second comparator CMP2 vis-à-vis the mechanism for detecting the push of a control button lies in the threshold values TH1 and TH2, which are different. In other words, the first CMP1 and second CMP2 comparators rely on distinct sets of thresholds. Indeed, as explained in detail later on, depending on the circumstances and, in particular, according to whether or not the noise cancellation mechanism is activated, different DC power supply values are provided by the device DEV for the listening device that is connected thereto. Depending on the circumstances, the first comparator CMP1 or the second comparator CMP2 is activated (or neither). The threshold values TH1 and TH2 are defined by respectively taking account of these different power supply values. Activating one or other of said comparators therefore amounts to selecting the set of thresholds to be applied according to whether or not the noise cancellation mechanism is activated.

The second comparator CMP2 is moreover suited to controlling the module M, so as to mute the correction signals from the module ANC when the second comparator CMP2 has detected the push of a control button of the listening device connected to the device DEV, and to apply the correction signals from the module ANC when the second comparator CMP2 has detected that the push of said control button of the listening device connected to the device DEV has come to an end. This joint behaviour of the second comparator CMP2 and the module M makes it possible to reduce noise that is inherent in the application of the ambient noise cancellation mechanism when the digital microphones are no longer supplied with power on account of a control button being pushed. Indeed, as can be seen in FIGS. 2A and 2B which are described below, pushing a control button shorts the supply of power to said digital microphones.

The transitions between muting of the correction signals and application of the correction signals can be carried out progressively.

The device DEV moreover has a first selector S1. The first selector S1 is suited to receiving at its input a DC power supply signal VCC that is provided by the integrated circuit IC via a resistor R6 (input 'e1' of the first selector S1). By way of example, the resistor R6 has a value of 2.2 kΩ. The first selector S1 is moreover suited to receiving at its input the DC power supply signal VCC provided by the integrated circuit IC via a resistor R7 (input 'e2' of the first selector S1). By way of example, the resistor R7 has a value of 180Ω. The first selector S1 is moreover suited to providing at its output, on command, the signals received at one or other of its inputs. The output of the first selector S1 is connected to the pin DP1. The first selector S1 is moreover suited to being controlled by the control software module CTRL via the interface IF, so as to control whether the power supply signal provided at the output by the first selector S1 passes through the resistor R6 or through the resistor R7, the resistor R6 being suited to supplying power to a listening device of type T2 and the resistor R7 being suited to supplying power to a listening device of type T3 or of type T4.

In a variant embodiment, the first selector S1 is omitted. In this case, the integrated circuit has a first DC power supply output VCC1, to which the resistor R6 is connected, and a second DC power supply output VCC2, to which the resistor R7 is connected. Instead of the first selector S1, the resistors R6 and R7 are connected to the pin DP1. The integrated circuit is then suited to selectively activating, on command from the control software module CTRL, the first DC power supply output VCC1 or the second DC power supply output VCC2.

The device DEV moreover preferably has a second selector S2. The second selector S2 is suited to receiving at its input the signals provided at the output by the first amplifier A1 (input 'e1' of the second selector S2). The second selector S2 is moreover suited to receiving at its input the signals provided at the output by the first amplifier A1 after passage through an assembly formed by a resistor R5 and a coil L5 in series (input 'e2' of the second selector S2). By way of example, the resistor R5 has a value of 47Ω and the coil L5 has a value of 10 µH, for example. The second selector S2 is moreover suited to providing at its output, on command, the signals received at one or other of its inputs. The output of the second selector S2 is connected to the pin DP3. The second selector S2 is moreover suited to being controlled by the control software module CTRL via the interface IF, so as to control whether or not the signals provided at the output by the first amplifier A1 pass through the assembly formed by the resistor R5 and the coil L5 before being provided for the pin DP3. When the second selector is not present, the assembly formed by the resistor R5 and the coil L5 is directly connected between the output of the first amplifier A1 and the pin DP3.

The device DEV moreover preferably has a third selector S3. The third selector S3 is suited to receiving at its input the signals provided at the output by the second amplifier A2 (input 'e1' of the third selector S3). The third selector S3 is moreover suited to receiving at its input the signals provided at the output by the second amplifier A2 after passage through an assembly formed by a resistor R4 and a coil L4 in series (input 'e2' of the third selector S3). By way of example, the resistor R4 has a value of 47Ω and the coil L4 has a value of 10 μH, for example. The third selector S3 is moreover suited to providing at its output, on command, the signals received at one or other of its inputs. The output of the third selector S3 is connected to the pin DP2. The third selector S3 is moreover suited to being controlled by the control software module CTRL via the interface IF, so as to control whether or not the signals provided at the output by the second amplifier A2 pass through the assembly formed by the resistor R4 and the coil L4 before being provided for the pin DP2. The assembly formed by the resistor R4 and the coil L4 helps to make it possible to superimpose the timing clock of the digital microphones on the left-side audio signals when the ambient noise cancellation mechanism is activated. The assembly formed by the resistor R5 and the coil L5 allows, when the ambient noise cancellation mechanism is activated, substantially the same impedance matching to be applied to the right-side audio signals as that which is applied to the left-side audio signals by the assembly formed by the resistor R4 and the coil L4. When the third selector is not present, the assembly formed by the resistor R4 and the coil L4 can be directly connected between the output of the second amplifier A2 and the pin DP2; otherwise, the assembly formed by the resistor R4 and the coil L4 can be omitted.

The device DEV moreover preferably has an assembly formed by a resistor R9, two capacitors C8 and C9 and a coil L6. By way of example, the resistor R9 has a value of 100Ω, the capacitor C8 has a value of 10 nF, for example, the capacitor C9 has a value of 1 nF, for example, and the coil L6 has a value of 10 μH, for example. Said assembly is such that: the resistor R9 is connected to the output of the module MIF that provides the timing clock of the digital microphones; the capacitor C8 is connected in series with the resistor R9; the capacitor C9 is connected between the capacitor C8 and the pin DP2; and the coil L6 is connected between the earth of the device DEV and the point of interconnection between the capacitors C8 and C9. Said assembly thus performs high-pass filtering on a square-wave clock signal provided by the module MIF, allowing low-frequency, potentially audible, interference to be rejected that would be induced by said timing clock vis-à-vis the left-side audio signal provided by the device DEV for the listening device that is connected thereto.

The device DEV moreover has an assembly formed by a capacitor C6 and resistors R8 and R80. By way of example, the capacitor C6 has a value of 10 nF, the resistor R8 has a value of 10 kΩ, for example, and the resistor R80 also has a value of 10 kΩ, for example. Said assembly is such that: the capacitor C6 is connected between the input of the module MIF that is intended to receive the signals captured by the digital microphones and the pin DP1; the resistor R8 is connected between said input of the module MIF and the earth of the device DEV; and the resistor R80 is connected between said input of the module MIF and the DC power supply VCC of the device DEV. Said assembly thus allows the signals provided by said digital microphones to be obtained by taking account of the presence of the supply of power for said digital microphones in the signal.

The device DEV is moreover such that the pin DP1 is connected via a capacitor C7 at the input of the third amplifier A3. By way of example, the capacitor C7 has a value of 10 μF. The capacitor C7 allows rejection of any DC component that is present in the signal on the pin DP1, namely the DC power supply component that is intended to supply power to the digital microphones, before said signal is provided for the third amplifier A3. The signal injected into the third amplifier A3 thus corresponds to a signal provided by the analogue vocal microphone when the listening device is of type T2 or of type T4.

Such an arrangement of the device DEV thus allows the signals from the analogue vocal microphone (if present) to be superimposed on the power supply signal selectively provided by the device DEV for the listening device that is connected thereto and allows the signals from the digital microphones (if present) to be superimposed on said power supply signal. This arrangement of the device DEV moreover allows selective transmission of the timing clock of the digital microphones in a manner superimposed on the left-side audio signals. It is thus possible to provide the listening device with the benefit of the ambient noise cancellation mechanism that is implemented by the device DEV, while relying on standard audio connections of TRRS type. This arrangement of the device DEV finally allows, by virtue of the control software module CTRL, selective activation of the ambient noise cancellation mechanism and therefore adequate configuration of the device DEV, according to the functionalities that the listening device connected to the device DEV has. This behavioural aspect of the control software module CTRL is explained in detail later on with reference to FIGS. 4 to 12.

The device DEV has been explained in detail above so as to allow selective transmission of the timing clock of the digital microphones in a manner superimposed on the left-side audio signals. The same result is obtained by selectively transmitting the timing clock of the digital microphones in a manner superimposed on the right-side audio signals, by reversing the connections at the output of the second S2 and third S3 selectors.

The various circuit logics referred to in this description may be implemented in software or in hardware. A number of different hardware circuits may be used to perform the various functions of the invention. Different software modules, each implementing a part of the logic which is needed to perform these functions may also be implanted, either in the listening device or in the audio producing device.

As indicated above, the listening device may be equipped with different kinds of sensors. One kind is a digital microphone, which will be used to capture the voice of the user of the listening device and/or the movements of his/her head. Another kind is an attitude measurement sensor. Such a sensor usually comprises accelerometers, and/or gyroscopes and/or magnetometers. It measures orientation/position in a reference frame of the listening device and these measurements may be converted into a reference frame of the user or of the earth. The motion sensors are driven by the timing clock signals and the motion signals may be used to improve the spatial rendering of the listening device.

Motion sensors signals can be transmitted superimposed to one of the audio channels, with the clock to drive the sensors on the other audio channel, as a substitute to an operating mode with a digital microphone. One of the control buttons may be then used to switch between the two modes. Alternatively, some listening devices may be equipped with digital microphones, some others with motion sensors. Alternatively, the two equipments may coexist in a listening device and two clocks at different, but compatible, frequencies may be superimposed on one audio channel, one to drive the microphone, the other one to drive the motion sensors. The signals from the motion sensors and the digital microphone may be then multiplexed and superimposed on the other audio channel, taking advantage of the fact that the sampling frequency of the sensors may be quite low (200 Hz, by way of example). Other physical parameters which can be converted to digital data may be captured by adequate sensors located in the listening device. These sensors may be used to measure pressure, temperature, humidity, etc. . . . and the data may be used to convey information to a communication device, such information being then possibly used to alert the user or be transmitted to a remote database.

FIG. 2A schematically illustrates a first listening device HDS for audio content that provides the benefit of the ambient noise cancellation mechanism that is implemented by the device DEV.

The first listening device HDS has a module CHM1 that is typically intended to be placed substantially on the chest of the user, a module EML that is intended to be placed at the left ear of the user and a module EMR that is intended to be placed at the right ear of the user.

The module EML has a digital microphone DML that is used in order to capture the ambient noise at the left ear of the user, and a loudspeaker SL that is used to provide the audio content for the left ear of the user. The module EMR has a digital microphone DMR that is used in order to capture the ambient noise at the right ear of the user, and a loudspeaker SR that is used to provide the audio content for the right ear of the user.

The first listening device HDS is thus of type T4 (i.e. of "headset" type providing the benefit of the ambient noise cancellation mechanism).

The module CHM1 is connected, by a first series of preferably screened wires, to a standard male audio connector TRRS so as to allow said first listening device HDS to be connected to the device DEV. The various pins of the male connector of TRRS type are referenced HP1, HP2, HP3 and HP4 in FIG. 2A. Pin HP1 is intended to be connected to the pin DP1 of the device DEV, the pin HP2 is intended to be connected to the pin DP2 of the device DEV, the pin HP3 is intended to be connected to the pin DP3 of the device DEV and the pin HP4 is intended to be connected to the pin DP4 of the device DEV.

The pin HP4 is connected to the earth of the module CHM1 so as to ensure that the device DEV and the listening device HDS share a common earth.

The module CHM1 is typically connected to the module EML by a second series of preferably screened wires and to the module EMR by a third series of preferably screened wires. Using screened wires allows interference that is potentially induced by a crosstalk between the signals from the digital microphones and the analogue audio signals bound for the loudspeakers to be limited.

The module CHM1 has at least one user control button, for example in the form of a pushbutton. Three pushbuttons PB1, PB2 and PB3 are shown in FIG. 2A, which typically corresponds to the three controls that are found on earphones for mobile phones: a combined pick-up/hang-up control button, a volume increase control button and a volume decrease control button. The pushbuttons of the module CHM1 can be assigned to other functionalities, according to the context of use of the device DEV and of the first listening device HDS.

Each pushbutton PB1, PB2 and PB3 is connected between the pin HP1 and the earth of the module CHM1 via respective resistors R1, R2 and R3. The resistors R1, R2 and R3 have distinct values so as to allow, when the user pushes a pushbutton, distinction of which of the pushbuttons PB1, PB2 and PB3 has effectively been pushed. By way of example, the resistor R1 has a value of $108\Omega$, the resistor R2 has a value of $139\Omega$, for example, and the resistor R3 has a value of $270\Omega$, for example. In other words, when the user pushes a pushbutton, the voltage value applied to the input of the first CMP1 and second CMP2 comparators is dependent on the value of the resistor via which said pushbutton is connected to the pin HP1.

The module CHM1 moreover has an analogue vocal microphone AM of MEMS (MicroElectrical Mechanical System) type, the output of which is connected to the pin HP1 via a capacitor C3. By way of example, the capacitor C3 has a value of 10 µF. The capacitor C3 allows any DC component that might come from the output of the analogue vocal microphone AM to be rejected, so as to limit the impact of signals from the analogue vocal microphone AM on signals from the digital microphones DML and DMR.

The module CHM1 moreover has a coil L1 that has one end connected to the pin HP1 and that thus provides the other end with the DC power supply component intended to supply power to the digital microphones DML and DMR, and the analogue vocal microphone AM, by virtue of the presence of a capacitor C1 connected between this other end of the coil L1 and the earth of the module CHM1. By way of example, the coil L1 has a value of 47 µH and the capacitor C1 has a value of 10 µF, for example. The supply of power to the digital microphones DML and DMR is thus ensured by wires PWL and PWR between the module CHM1 and the modules EML and EMR, respectively.

It can be noted that, on the basis of the arrangement presented in FIG. 2A, when there is a push on one of the control buttons, the digital microphones DML and DMR are again not supplied with power. This aspect can be taken into account by the module M of the device DEV, as described below with reference to FIG. 11.

The module CHM1 moreover has a capacitor C2 that has one end connected to the pin DP1 and that has the other end connected to the respective outputs of the digital microphones DML and DMR via wires DL and DR between the module CHM1 and the modules EML and EMR, respectively. By way of example, the capacitor C2 has a value of 10 µF. The capacitor C2 allows the signals generated by the digital microphones DML and DMR to be superimposed on the power supply signal provided by the device DEV via the pin HP1.

The module CHM1 is moreover suited to connecting to the pin HP2 a wire CL and a wire CR between the module CHM1 and the modules EML and EMR, respectively, the wires CL and CR being respectively intended to provide the timing clock of the digital microphones DML and DMR.

The module CHM1 moreover has an assembly formed by a coil L2 and a capacitor C4 in series, said assembly having one end connected to the pin HP2 and having the other end connected to a wire HL between the module CHM1 and the module EML, the wire HL being intended to provide the loudspeaker SL with the left-side audio signals. By way of example, the coil L2 has a value of 100 µH and the capacitor C4 has a value of 100 µF, for example. The assembly formed by the coil L2 and the capacitor C4 thus allows the timing clock signal of the digital microphones DML and DMR to be rejected from the signals received via the pin HP2.

The module CHM1 moreover has an assembly formed by a coil L3 and a capacitor C5 in series, said assembly having one end connected to the pin HP3 and the other end connected to a wire HR between the module CHM1 and the module EMR, the wire HR being intended to provide the loudspeaker SR with the right-side audio signals. By way of example, the coil L3 has a value of 100 µH and the capacitor C5 has a value of 100 µF, for example. The assembly formed by the coil L3 and the capacitor C5 allows substantially the same impedance matching to be applied to the right-side audio signals as that applied to the left-side audio signals by the assembly formed by the coil L2 and the capacitor C4.

An additional wire can be added between the module CHM1 and the module EMR, and another additional wire can be added between the module CHM1 and the module EML, so as to ensure that the modules CHM1, EML and EMR share a common earth. Screening of the other wires that are already present can also serve to obtain a common earth.

It is worth noting that, should the first listening device HDS be connected to a conventional device (without a noise cancellation mechanism in accordance with the previous description of the device DEV) for providing audio content via a connector taking a male plug of TRRS type, the first listening device HDS is detected as a listening device of "legacy headset" type and thus provides the same functionalities as a listening device of "legacy headset" type. It is worth noting that, should the first listening device HDS be connected to a conventional device (without a noise cancellation mechanism in accordance with the previous description of the device DEV) for providing audio content via a connector taking a male plug of TRS type, the first listening device HDS is detected as a listening device of "legacy headphone" type and thus provides the same functionalities as a listening device of "legacy headphone" type (the control buttons and the analogue vocal microphone are then inactive).

FIG. 2B schematically illustrates a second listening device HDS' for audio content that provides the benefit of the ambient noise cancellation mechanism implemented by the device DEV. The second listening device HDS' has a module CHM1' that is typically intended to be placed substantially on the chest of the user, the module EML that is intended to be placed at the left ear of the user and the module EMR that is intended to be placed at the right ear of the user. The module CHM1' takes up the principles of the module CHM1 of the first listening device HDS, except that the analogue vocal microphone AM of MEMS type is replaced by an analogue vocal microphone AE of electret type, the output of which is directly connected to the pin HP1. The second listening device HDS' is therefore also of type T4 (i.e. of "headset" type providing the benefit of the ambient noise cancellation mechanism).

It is worth noting that, should the second listening device HDS' be connected to a conventional device (without a noise cancellation mechanism in accordance with the previous description of the device DEV) for providing audio content via a connector taking a male plug of TRRS type, the second listening device HDS' is detected as a listening device of "legacy headset" type and thus provides the same functionalities as a listening device of "legacy headset" type. It is worth noting that, should the second listening device HDS' be connected to a conventional device (without a noise cancellation mechanism in accordance with the previous description of the device DEV) for providing audio content via a connector taking a male plug of type TRS, the second listening device HDS' is detected as a listening device of "legacy headphone" type and thus provides the same functionalities as a listening device of "legacy headphone" type (the control buttons and the analogue vocal microphone are then inactive).

FIG. 3 schematically illustrates a third listening device HDP for audio content providing the benefit of the ambient noise cancellation mechanism implemented by the device DEV. The third listening device HDP has a module CHM2 that is typically intended to be placed substantially on the chest of the user, the module EML that is intended to be placed at the left ear of the user and the module EMR that is intended to be placed at the right ear of the user. The module CHM2 takes up the principles of the module CHM1 of the first listening device HDS, except that the resistors R1, R2 and R3, the analogue microphone AM and the capacitor C3 are absent therefrom. The third listening device HDP is therefore of type T3 (i.e. "headphone" type providing the benefit of the ambient noise cancellation mechanism).

The third listening device HDP may also be provided with control buttons, which are arranged in the same manner as for the first listening device HDS. Just as within the context of FIG. 2A, when one of the control buttons is pushed, the digital microphones DML and DMR are again not supplied with power. This aspect can be taken into account by the module M of the device DEV, as described below with reference to FIG. 11.

It is worth noting that, should the third listening device HDP be connected to a conventional device (without a noise cancellation mechanism in accordance with the previous description of the device DEV) for providing audio content via a connector taking a male plug of TRRS type, the third listening device HDP is detected as a listening device of "legacy headset" type, but is then solely capable of providing the functionalities of a listening device of "legacy headphone" type. It is worth noting that, should the third listening device HDP be connected to a conventional device (without a noise cancellation mechanism in accordance with the previous description of the device DEV) for providing audio content via a connector taking a male plug of TRS type, the third listening device HDP is detected as a listening device of "legacy headphone" type and thus provides the same functionalities as a listening device of "legacy headphone" type.

FIG. 4 schematically illustrates an algorithm, which is implemented by the device DEV and more particularly by the control software module CTRL, for detecting a type of listening device that is connected to said device DEV (i.e. functionalities that said listening device has). In other words, the algorithm in FIG. 4 allows the device DEV to determine whether the listening device connected to said device DEV is of type T1, of type T2, of type T3 or of type T4.

In a step 401, the DC power supply VCC is cut.

In a next step 402, the device DEV deactivates (if this is not already the case) the generation of the clock that is intended to provide timing for the digital microphones when the listening device possibly connected to the device DEV allows the ambient noise cancellation mechanism to be implemented. As shown in the diagram in FIG. 1, the control software module CTRL uses the interface IF to instruct the module MIF to deactivate said clock.

In a next step 403, the device DEV starts a check to check whether a male connector of TRS or TRRS type has been inserted into said standard female audio connector. As shown in the diagram in FIG. 1, the control software module CTRL interrogates the module JD via the interface IF.

In a next step 404, the device DEV therefore checks whether a male connector of TRS or TRRS type has been inserted into said standard female audio connector. If this is the case, a step 405 is performed; otherwise, step 404 is repeated.

In step 405, the device DEV activates the DC power supply VCC, configures the first S1, second S2 and third S3 selectors at their respective inputs 'e1', and starts a check to check whether the pins DP1 and DP5 are shorted (which would imply that the connected listening device is of type T1). As shown in the diagram in FIG. 1, the control software module CTRL interrogates the first comparator CMP1.

In a next step 406, the device DEV therefore checks whether the pins DP1 and DP5 are shorted, i.e. whether the pin DP1 is shorted to the earth of the device DEV. If the pins DP1 and DP5 are shorted, a step 407 is performed; otherwise, a step 408 is performed.

In step 407, the device DEV assumes that the connected listening device is of type T1, and then a step 417 is performed.

In step 408, the device DEV activates the generation of the clock that is intended to provide timing for the digital microphones that the connected listening device could have in order to implement the ambient noise cancellation mechanism. As shown in the diagram in FIG. 1, the control software module CTRL uses the interface IF to instruct the module MIF to activate said clock. The device DEV moreover configures the first S1, second S2 and third S3 selectors at their respective inputs 'e2'.

In a next step 409, the device DEV starts a check to check whether the connected listening device has digital microphones that can be used for implementing the noise cancellation mechanism. As shown in the diagram in FIG. 1, the control software module CTRL interrogates the module HD via the interface IF.

In a next step 410, the device DEV therefore checks whether the connected listening device has such digital microphones. If this is the case, a step 411 is performed; otherwise, a step 413 is performed.

In step 411, the device DEV deactivates the generation of the clock that is intended to provide timing for the digital microphones, which the connected listening device could have, in order to implement the ambient noise cancellation mechanism. As shown in the diagram in FIG. 1, the control software module CTRL uses the interface IF to instruct the module MIF to deactivate said clock. The device DEV moreover configures the first S1, second S2 and third S3 selectors at their respective inputs 'e1'. The device DEV moreover starts a check to check whether the connected listening device has an analogue vocal microphone, by checking the power consumption via the pin DP1 (the timing clock being deactivated, the possible digital microphones are inactive, and therefore have zero, or at least negligible, consumption vis-à-vis the power consumption of an analogue vocal microphone). As shown in the diagram in FIG. 1, the control software module CTRL interrogates the first comparator CMP1.

In a next step 412, the device DEV therefore checks whether the power consumption via the pin DP1 is zero or negligible, i.e. below a predefined threshold. If this is the case, a step 416 is performed; otherwise, a step 415 is performed.

In step 413, the device DEV deactivates the generation of the clock that is intended to provide timing for the digital microphones, which the connected listening device could have, in order to implement the ambient noise cancellation mechanism. As shown in the diagram in FIG. 1, the control software module CTRL uses the interface IF to instruct the module MIF to deactivate said clock. The device DEV moreover configures the first S1, second S2 and third S3 selectors at their respective inputs 'e1'. Then, in a next step 414, the device DEV assumes that the connected listening device is of type T2, and then step 417 is performed.

In step 415, the device DEV assumes that the connected listening device is of type T4, and then step 417 is performed.

In step 416, the device DEV assumes that the connected listening device is of type T3, and then step 417 is performed.

In step 417, the device DEV generates a notification that is representative of the type of listening device detected. This allows association with a configuration operation for the device DEV according to the type of listening device detected, as described below with reference to FIG. 6.

The algorithm in FIG. 4 is subsequently terminated. The algorithm in FIG. 4 thus allows detection of the type of a listening device that the user connects to the device DEV. Preferably, it is desirable to monitor maintenance of the connection between the device DEV and the listening device, in order to be able to restart the algorithm in FIG. 4 if need be. Such a monitoring mechanism is described below with reference to FIG. 5.

FIG. 5 schematically illustrates an algorithm, which is implemented by the device DEV and more particularly by the control software module CTRL, for monitoring said connection.

In a step 501, the device DEV starts a check to check whether the male connector of TRS or TRRS type is still inserted in said standard female audio connector. As shown in the diagram in FIG. 1, the control software module CTRL interrogates the module JD via the interface IF.

In a next step 502, the device DEV therefore checks whether the male connector of TRS or TRRS type is still inserted in said standard female audio connector or whether said male connector has been disengaged from said standard female audio connector. If such release has been carried out, a step 503 is performed; otherwise, step 501 is repeated.

In step 503, the device DEV deactivates the ambient noise cancellation mechanism (if this is not already the case) and deactivates the generation of the clock that is intended to provide timing for the possible digital microphones (if this is not already the case). As shown in the diagram in FIG. 1, the control software module CTRL uses the interface IF to respectively deactivate the module ANC and instruct the module MIF to deactivate said clock.

In a next step 504, the device DEV cuts the DC power supply VCC and, in a next step 505, the device DEV generates a notification that is representative of the disengagement of said male connector. This provides the possibility of restarting the algorithm in FIG. 4, as described below with reference to FIG. 6.

FIG. 6 schematically illustrates an algorithm, which is implemented by the device DEV and more particularly by the control software module CTRL, for configuring said device DEV according to the type of the listening device connected to said device DEV. The algorithm in FIG. 6 is typically started at start-up or following reinitialization of the device DEV.

In a step 601, the device DEV performs an operation for detecting connection of a listening device and, if need be, for determining the type of connected listening device. To do this, the device DEV executes the algorithm in FIG. 4.

In a next step 602, the device DEV has detected that a listening device has been connected to the device DEV and obtains a piece of information that is representative of the type of the connected listening device. This information is provided by the notification generated in step 417 in FIG. 4.

In a next step 603, the device DEV activates a mechanism for monitoring the maintenance of the connection between the device DEV and the listening device. To do this, the device DEV starts the execution, in parallel, of the algorithm in FIG. 5.

In a next step 603, the device DEV configures itself according to the type of listening device connected to said device DEV. If the connected listening device is of type T1, the device DEV executes the algorithm in FIG. 7; if the connected listening device is of type T2, the device DEV executes the algorithm in FIG. 8; if the connected listening device is of type T3, the device DEV executes the algorithm in FIG. 9; and if the connected listening device is of type T4, the device DEV executes the algorithm in FIG. 10, or, as a variant, the algorithm in FIG. 12. The device DEV is then configured adequately vis-à-vis the implementation of the ambient noise cancellation mechanism, according to the functionalities that the connected listening device has.

In a next step 605, the device DEV checks whether a notification that is representative of disengagement of the male connector is generated by the monitoring mechanism activated in step 603. If this is the case, step 601 is repeated; otherwise, step 605 is repeated.

FIG. 7 schematically illustrates an algorithm, which is implemented by the device DEV and more particularly by the control software module CTRL, for applying a first configuration for said device DEV, when the connected listening device is of type T1.

In a step 701, the device DEV cuts the DC power supply VCC (if this is not already the case).

In a next step 702, the device DEV deactivates the ambient noise cancellation mechanism (if this is not already the case). As shown in the diagram in FIG. 1, the control software module CTRL uses the interface IF to deactivate the module ANC.

In a next step 703, the device DEV deactivates the mechanism for detecting the push of a control button, and a mechanism for managing application of the ambient noise cancellation mechanism (if implemented and if this has not already been done). Such a mechanism for managing application of the ambient noise cancellation mechanism is described below with reference to FIG. 11. As shown in the diagram in FIG. 1, the control software module CTRL uses the interface IF to respectively deactivate the first comparator CMP1 and the second comparator CMP2.

In a next step 704, the device DEV configures the second S2 and third S3 selectors at their respective inputs 'e1'. Moreover, the device DEV deactivates the generation of the clock that is intended to provide timing for the possible digital microphones (if it is not already the case). As shown in the diagram in FIG. 1, the control software module CTRL uses the interface IF to instruct the module MIF to deactivate said clock. The algorithm in FIG. 7 is then terminated.

FIG. 8 schematically illustrates an algorithm, which is implemented by the device DEV and more particularly by the control software module CTRL, for applying a second configuration for said device DEV when the connected listening device is of type T2.

In a step 801, the device DEV activates the DC power supply VCC (if this is not already the case).

In a next step 802, the device DEV configures the first S1, second S2 and third S3 selectors at their respective inputs 'e1'. Moreover, the device DEV deactivates the generation of the clock that is intended to provide timing for the possible digital microphones (if this is not already the case). As shown in the diagram in FIG. 1, the control software module CTRL uses the interface IF to instruct the module MIF to deactivate said clock.

In a next step 803, the device DEV activates the mechanism for detecting the push of a control button. As shown in the diagram in FIG. 1, the control software module CTRL uses the interface IF to instruct the first comparator CMP1 to activate the mechanism for detecting the push of a control button, and deactivates the second comparator CMP2.

In a next step 804, the device DEV deactivates the ambient noise cancellation mechanism (if this is not already the case). As shown in the diagram in FIG. 1, the control software module CTRL uses the interface IF to deactivate the module ANC. The listening device being of type T2, within the context of applications requiring capture of the voice of the user, said device DEV obtains an analogue audio signal that is representative of a voice capture from the user and received in a manner superimposed on said DC power supply signal via said pin DP1. As shown in the diagram in FIG. 1, the control software module CTRL activates the third amplifier A3. The control software module CTRL can activate the third amplifier A3 only when the control software module CTRL has information that such an application is being executed. The algorithm in FIG. 8 is then terminated.

FIG. 9 schematically illustrates an algorithm, which is implemented by the device DEV and more particularly by the control software module CTRL, for applying a third configuration for said device DEV when the connected listening device is of type T3.

In a step 901, the device DEV activates the DC power supply VCC (if this is not already the case).

In a next step 902, the device DEV configures the first S1, second S2 and third S3 selectors at their respective inputs 'e1'. Moreover, the device DEV activates the generation of the clock that is intended to provide timing for said digital microphones (if this is not already the case). As shown in the diagram in FIG. 1, the control software module CTRL uses the interface IF to instruct the module MIF to activate said clock.

In a next step 903, the device DEV deactivates the mechanism for detecting the push of a control button, and a mechanism for managing application of the ambient noise cancellation mechanism (if implemented and if this has not already been done). Such a mechanism for managing application of the ambient noise cancellation mechanism is described below with reference to FIG. 11. As shown in the diagram in FIG. 1, the control software module CTRL uses the interface IF to deactivate the first comparator CMP1 and the second comparator CMP2. In a particular embodiment, when a listening device of type T3 is expected to be able to have control buttons, the device DEV activates the mechanism for detecting the push of a control button. As shown in the diagram of FIG. 1, the control software module CTRL then uses the interface IF to instruct the first comparator CMP1 to activate the mechanism for detecting the push of a control button, but uses the interface IF to deactivate the second comparator CMP2.

In a next step 904, the device DEV activates the ambient noise cancellation mechanism. As shown in the diagram in FIG. 1, the control software module CTRL activates the module ANC. The algorithm in FIG. 9 is then terminated.

In a particular embodiment, when the device DEV activates an application requiring capture of the voice of the user, the device DEV uses the audio signals from said digital microphones. The device DEV can apply processing so as to take into account that the voice of the user is captured by the two digital microphones, which are located at the ears of the user, since the connected device does not have an analogue vocal microphone that would be located on the chest of the user.

FIG. 10 schematically illustrates an algorithm, which is implemented by the device DEV and more particularly by the control software module CTRL, for applying a fourth configuration for said device DEV when the connected listening device is of type T4.

In a step 1001, the device DEV activates the DC power supply VCC (if this is not already the case).

In a next step 1002, the device DEV configures the first S1, second S2 and third S3 selectors at their respective inputs 'e2'. Moreover, the device DEV activates the generation of the clock that is intended to provide timing for said digital microphones (if this is not already the case). As shown in the diagram in FIG. 1, the control software module CTRL uses the interface IF to instruct the module MIF to activate said clock.

In a next step 1003, the device DEV activates the mechanism for detecting the push of a control button and preferably activates the mechanism for managing application of the ambient noise cancellation mechanism. As a reminder, such a mechanism for managing application of the ambient noise cancellation mechanism is described below with reference to FIG. 11. As shown in the diagram in FIG. 1, the control software module CTRL uses the interface IF to activate the comparator CMP2 and uses the interface IF to deactivate the first comparator CMP1 (if this is not already the case).

In a next step 1004, the device DEV activates the ambient noise cancellation mechanism. As shown in the diagram in FIG. 1, the control software module CTRL activates the module ANC.

In a next step 1005, when the device DEV activates an application requiring capture of the voice of the user, the device DEV uses the audio signals from said digital microphones. The device DEV can apply processing so as to take into account that the voice of the user is captured by the two digital microphones, which are located at the ears of the user, rather than by the analogue vocal microphone, which is located on the chest of the user. The algorithm in FIG. 10 is then terminated. Within the context of the algorithm in FIG. 10, the analogue vocal microphone of the connected listening device is not used. This avoids interference between the use of the analogue vocal microphone and the ambient noise cancellation mechanism. The benefit of having an analogue vocal microphone on a listening device of type T4 is then that it makes said listening device compatible with the conventional devices for providing audio content that have a standard audio connector of TRRS type, which require the analogue vocal microphone. A variant embodiment allowing the use of the analogue vocal microphone within the context of an application requiring capture of the voice of the user is described below with reference to FIG. 12.

FIG. 12 therefore schematically illustrates an algorithm having a variant of the algorithm in FIG. 10.

In a step 1201, the device DEV activates the DC power supply VCC (if this is not already the case).

In a next step 1202, the device DEV configures the first S1, second S2 and third S3 selectors at their respective inputs 'e2'. Moreover, the device DEV activates the generation of the clock that is intended to provide timing for said digital microphones (if this is not already the case). As shown in the diagram in FIG. 1, the control software module CTRL uses the interface IF to instruct the module MIF to activate said clock.

In a next step 1203, the device DEV activates the mechanism for detecting the push of a control button and preferably activates the mechanism for managing application of the ambient noise cancellation mechanism. As a reminder, such a mechanism for managing application of the ambient noise cancellation mechanism is described below with reference to FIG. 11. As shown in the diagram in FIG. 1, the control software module CTRL uses the interface IF to activate the comparator CMP2 and uses the interface IF to deactivate the first comparator CMP1 (if this is not already the case).

In a next step 1204, the device DEV activates the ambient noise cancellation mechanism. As shown in the diagram in FIG. 1, the control software module CTRL activates the module ANC.

In a next step 1205, the device DEV checks whether an application requiring capture of the voice of the user is started. If this is the case, a step 1206 is performed; otherwise, step 1205 is repeated.

In step 1206, the device DEV deactivates the ambient noise cancellation mechanism and deactivates the generation of the clock that is intended to provide timing for the digital microphones. As shown in the diagram in FIG. 1, the control software module CTRL uses the interface IF to respectively deactivate the module ANC and instruct the module MIF to deactivate said clock. Moreover, the device DEV configures the first S1, second S2 and third S3 selectors at their respective inputs 'e1'.

In a next step 1207, the device DEV ensures that the mechanism for detecting the push of a control button takes into account the deactivation of the ambient noise cancellation mechanism. As shown in the diagram in FIG. 1, the control software module CTRL uses the interface IF to deactivate the comparator CMP2 and uses the interface IF to instruct the first comparator CMP1 to activate the mechanism for detecting the push of a control button.

In a next step 1208, the device DEV checks whether the application requiring capture of the voice of the user is terminated. If this is the case, step 1202 is repeated; otherwise, step 1208 is repeated.

The algorithm in FIG. 12 is terminated when the mechanism for monitoring maintenance of the connection between the device DEV and the listening device provides notification of disengagement of the listening device. The principle applied by the algorithm in FIG. 12 is therefore deactivation of the ambient noise cancellation mechanism in the event of an application requiring the use of the analogue vocal microphone, which avoids the signals from the digital microphones interfering with the signal from the analogue vocal microphone.

Within the context of FIG. 12, the device DEV obtains an analogue audio signal that is representative of a voice capture from the user and received in a manner superimposed on said DC power supply signal via said pin DP1. As shown in the diagram in FIG. 1, the control software module CTRL activates the third amplifier A3. The control software module CTRL can activate the third amplifier A3 only when the control software module CTRL has information that such an application is being executed.

FIG. 11 schematically illustrates an algorithm, which is implemented by the device DEV and more particularly by the second comparator CMP2, for managing application of the ambient noise cancellation mechanism.

In a step 1101, the device DEV detects whether a control button that the connected listening device has is pushed. If this is the case, a step 1102 is performed; otherwise, step 1101 is repeated.

In step 1102, the device DEV mutes the correction signals from the ambient noise cancellation mechanism. This muting can be progressive. As shown in the diagram in FIG. 1, the second comparator CMP2 instructs the module M to mute the correction signals from the module ANC.

In a next step 1103, the device DEV detects whether said control button has finished being pushed. If this is the case, a step 904 is performed; otherwise, step 1103 is repeated.

In step 1104, the device DEV restores the correction signals from the ambient noise cancellation mechanism. This restoration can be progressive. As shown in the diagram in FIG. 1, the second comparator CMP2 instructs the module M to restore the correction signals from the module ANC. Step 1101 is then repeated.

In the detailed description above, the control of the ambient noise cancellation mechanism and the configuration of the device DEV are performed by the control software module CTRL. The processor PROC is thus capable of executing instructions loaded into a RAM (Random Access Memory) memory from a ROM (Read Only Memory) memory, from an external memory, from a storage medium such as a hard disk HDD (Hard Disk Drive) or from a communication network. When the device DEV is powered up, the processor PROC is capable of reading instructions from the RAM memory and of executing them. These instructions form a computer program that causes the processor PROC to implement all or some of the algorithms and steps described here in connection with the control software module CTRL.

In the detailed description above, passive electronic elements (resistors, capacitors, coils) as well as selectors are present in the device DEV outside the integrated circuit IC. These passive electronic elements, as well as the selectors, can also be integrated in the integrated circuit IC.

Another distribution between the modules implemented in software form and modules implemented in hardware form can be implemented. In other words, the separation between modules implemented in the integrated circuit IC and modules executed by the processor PROC. All of the functions performed by the integrated circuit IC can thus be implemented in software form and all of the functions performed by the integrated circuit IC can thus be implemented in hardware form. Thus, all or some of the algorithms, modules and steps described here can be implemented in software form by virtue of the execution of a set of instructions by a programmable machine, such as a DSP (Digital Signal Processor) or a processor. All or some of the algorithms, modules and steps described here can also be implemented in hardware form by a machine or a dedicated component, such as an FPGA (Field Programmable Gate Array) or an ASIC (Application-Specific Integrated Circuit).

The invention claimed is:

1. A device for providing audio content, said device configured to provide a listening device with audio signals that are representative of said audio content via a standard female audio connector configured to receive four-pole male connectors and three-pole male connectors, said device comprising:
   first circuit logic configured to selectively transmit a DC power supply signal to the listening device via a first pin of said standard female audio connector;
   second circuit logic configured to selectively implement a cancellation mechanism of ambient noise using digital audio signals to be received, via the first pin, being superimposed on said DC power supply signal;
   third circuit logic configured to selectively transmit to the listening device via a second pin of said standard female audio connector, a timing clock superimposed on said audio signals and configured to drive sensors equipping the listening device to generate digital signals via said first pin;
   fourth circuit logic configured to configure itself vis-à-vis the DC power supply signal, the ambient noise cancellation mechanism and the timing clock, according to a determined type of listening device effectively connected via said standard female audio connector;
   wherein, following detection of a male connector that is present in said standard female audio connector, said device for providing audio content successively implements:
   fifth circuit logic configured to determine if there is a short circuit between said first pin and an earth of said device for providing audio content, and if this is the case said device for providing audio content is configured to determine that the connected listening device is of a first type:
   sixth circuit logic configured to determine, by activating said timing clock, whether signals from sensors are received as superimposed on said DC power supply signal via said first pin, and if this is not the case said device for providing audio content is configured to determine that the connected listening device is of a second type; and
   seventh circuit logic configured to determine, by deactivating said timing clock, whether said first pin has a power consumption below a predefined threshold, and if this is the case said device for providing audio content is suited to determining that the connected listening device is of a third type, and otherwise of a fourth type.

2. The device for providing audio content of claim 1, wherein, when the connected listening device is determined to be of the first type said device for providing audio content configures itself so as to deactivate the DC power supply signal via said first pin, to deactivate the ambient noise cancellation mechanism, and to deactivate said timing clock.

3. The device for providing audio content of claim 1 wherein, when the connected listening device is determined to be of the second type said device for providing audio content configures itself so as to deactivate the ambient noise cancellation mechanism, to deactivate said timing clock, to activate the DC power supply signal via said first pin to a value taking account of the fact that the ambient noise cancellation mechanism is deactivated, and to obtain an analogue audio signal that is representative of voice capture from a user of said listening device and received in a manner superimposed on said DC power supply signal via said first pin.

4. The device for providing audio content of claim 1, wherein, when the connected listening device is determined to be of the third type said device for providing audio content configures itself so as to activate the ambient noise cancellation mechanism, to activate said timing clock, and to activate the DC power supply signal via said first pin to a value taking account of the fact that the ambient noise cancellation mechanism is activated.

5. The device for providing audio content of claim 1, wherein, when the connected listening device is determined to be of the fourth type said device for providing audio content configures itself so as to activate the ambient noise cancellation mechanism, to activate said timing clock, to activate the DC power supply signal via said first pin to a value taking account of the fact that the ambient noise cancellation mechanism is activated, and, in the case of an application requiring capture of signals from the sensors, to use said digital signals received via said first pin within the context of said application.

6. The device for providing audio content of claim 1, wherein, when the connected listening device is determined to be of the fourth type said device for providing audio content configures itself, in the case of an application not requiring capture of signals from the sensors, so as to activate the ambient noise cancellation mechanism, to activate said timing clock, and to activate the DC power supply signal via said first pin to a value taking account of the fact that the ambient noise cancellation mechanism is activated, and, in the case of an application requiring capture of signals from the sensors, so as to deactivate the ambient noise cancellation mechanism, to deactivate said timing clock, to activate the DC power supply signal via said first pin to a value taking account of the fact that the ambient noise cancellation mechanism is deactivated, and to use an analogue signal that is representative of signals from the sensors and received in a manner superimposed on said DC power supply signal via said first pin within the context of said application.

7. The device for providing audio content of claim 1, further configured so that the DC power supply signal has a distinct value according to whether or not the noise cancellation mechanism is activated, and in that said device for providing audio content implements:
a mechanism for detecting the push of a control button, relying on a comparison of voltage applied to said first pin with a set of thresholds that is selected from two distinct sets of thresholds, said sets of thresholds being respectively adapted to said distinct values of the DC power supply; and
eighth circuit logic configured to select the set of thresholds to be applied according to whether or not the noise cancellation mechanism is activated.

8. The device for providing audio content of claim 7, wherein, when the ambient noise cancellation mechanism is activated said device for providing audio content further comprises:
ninth circuit logic configured to generate correction signals in the ambient noise cancellation mechanism;
tenth circuit logic configured to add the correction signals to said audio signals;
and, when the push of a control button is thus detected, eleventh circuit logic configured to stop the addition of the correction signals to said audio signals until the push of said control button is stopped.

9. The device for providing audio content of claim 1, wherein, in order to transmit said timing clock to the listening device, said timing clock being superimposed on said audio signals, said device for providing audio content comprises a high-pass filter applied to a square-wave clock signal, itself comprising:
a resistor;
a first capacitor and a second capacitor; and
a coil;
which are arranged so that the resistor is configured to receive the square-wave clock signal, the first and second capacitors being in series with the resistor such that the first capacitor is between the resistor and the second capacitor, the coil being connected between an earth and a point at which the first and second capacitors are interconnected, another terminal of the second capacitor being connected to said second pin.

10. The device for providing audio content of claim 1, wherein the sensors in the listening device to which the device for providing audio content is configured to be connected comprise a digital microphone to capture the voice of a user of the listening device.

11. The device for providing audio content of claim 1, wherein the sensors in the listening device to which the device for providing audio content is configured to be connected comprise motion sensors to capture movement of the head of a user of the listening device.

12. The device for providing audio content of claim 1, wherein the second circuit logic is configured to transition progressively between off and on states of the noise cancellation mechanism.

13. A method implemented by a device for providing audio content providing a listening device with audio signals that are representative of said audio content via a standard female audio connector that is configured to receive four-pole male connectors and three-pole male connectors, wherein said device for providing audio content performs the following steps:
selectively transmitting a DC power supply signal to the listening device via a first pin of said standard female audio connector;
selectively implementing a cancellation mechanism for ambient noise from digital audio signals to be received, via the first pin, being superimposed on said DC power supply signal;
selectively transmitting to the listening device via a second pin of said standard female audio connector, a timing clock superimposed on said audio signals to drive sensors equipping the listening device in order to generate digital signals via said first pin;
configuring itself vis-à-vis the DC power supply signal, the ambient noise cancellation mechanism and the timing clock, according to a determined type of listening device that is effectively connected via said standard female audio connector;
wherein, following detection of a male connector that is present in said standard female audio connector, said device for providing audio content successively performs the following steps:
determining if there is a short circuit between said first pin and the earth, and if this is the case said device for providing audio content determines that the connected listening device is of a first type;
determining, by activating said timing clock, whether signals from sensors are received being superimposed on said DC power supply signal via said first pin, and if this is not the case said device for providing audio content determines that the connected listening device is of a second type; and
determining, by deactivating said timing clock, whether said first pin has a power consumption below a predefined threshold, and if this is the case said device for providing audio content determines that the connected listening device is of a third type, and otherwise of a fourth type.

14. A computer program stored on a non-transitory storage device, said computer program comprising instructions for implementing, through a device for providing audio content, the method according to claim 13 when said program is executed by a processor of the device for providing audio content.

* * * * *